US011949691B2

(12) United States Patent
Manevich et al.

(10) Patent No.: US 11,949,691 B2
(45) Date of Patent: Apr. 2, 2024

(54) MALICIOUS PEER IDENTIFICATION

(71) Applicant: International Business Machines Corporation, Armonk, NY (US)

(72) Inventors: Yacov Manevich, Haifa (IL); Artem Barger, Haifa (IL); Marko Vukolić, Rueschlikon (CH); Alessandro Sorniotti, Rueschlikon (CH); Angelo De Caro, Zürich (CH); Elli Androulaki, Zürich (CH)

(73) Assignee: International Business Machines Corporation, Armonk, NY (US)

(*) Notice: Subject to any disclaimer, the term of this patent is extended or adjusted under 35 U.S.C. 154(b) by 903 days.

(21) Appl. No.: 16/422,956

(22) Filed: May 24, 2019

(65) Prior Publication Data

US 2020/0374300 A1 Nov. 26, 2020

(51) Int. Cl.
| H04L 29/06 | (2006.01) |
| G06F 16/22 | (2019.01) |
| G06F 16/23 | (2019.01) |
| H04L 9/40 | (2022.01) |

(52) U.S. Cl.
CPC ...... *H04L 63/1416* (2013.01); *G06F 16/2255* (2019.01); *G06F 16/2379* (2019.01)

(58) Field of Classification Search
CPC . H04L 63/1416; H04L 9/3239; H04L 9/3247; H04L 9/3265; H04L 2209/38; H04L 63/14; H04L 63/1408; G06F 16/2255; G06F 16/2379; G06F 21/64; G06Q 20/3825; G06Q 20/389; G06Q 40/04
See application file for complete search history.

(56) References Cited

U.S. PATENT DOCUMENTS

| 9,807,106 | B2 | 10/2017 | Daniel et al. |
| 9,836,908 | B2 | 12/2017 | Spanos et al. |
| 11,238,448 | B1* | 2/2022 | Narayanan ........... G06Q 20/127 |
| 11,251,975 | B1* | 2/2022 | Wahla .................... G06Q 20/02 |
| 2017/0048217 | A1* | 2/2017 | Biggs .................. H04L 63/0435 |
| 2018/0165476 | A1 | 6/2018 | Carey et al. |

(Continued)

FOREIGN PATENT DOCUMENTS

| CN | 109361661 B | 7/2020 |
| CN | 107657438 B | 12/2020 |
| WO | 2018224943 A1 | 12/2018 |

OTHER PUBLICATIONS

Fabric, "Hyperledger Fabric", dated May 20, 2018, downloaded from the Internet on Feb. 16, 2022, pp. 1-494, URL: https://github.com/hyperledger/fabric/tree/b1b43e437835efe31cc7378f1eacdec605b5c10c/docs/source (Year: 2018).*

(Continued)

*Primary Examiner* — Malcolm Cribbs

(57) ABSTRACT

An example operation may include one or more of receiving, by each of one or more peripheral peers of a blockchain network, a new block from an orderer peer, calculating a hash of the new block, determining the calculated hash is different than hashes from a majority of peripheral peers, determining that one or more blocks that correspond to the different hashes from the majority of peripheral peers are different from the new block, and in response ceasing committing blocks to the blockchain network.

20 Claims, 22 Drawing Sheets

(56) References Cited

U.S. PATENT DOCUMENTS

| | | | | |
|---|---|---|---|---|
| 2018/0341930 A1* | 11/2018 | Moir | .................... | H04L 9/3247 |
| 2019/0109713 A1* | 4/2019 | Clark | .................... | G06F 16/182 |
| 2020/0320204 A1* | 10/2020 | Venable, Sr. | ......... | H04L 9/3239 |
| 2020/0366495 A1* | 11/2020 | Mahoney | ............ | G06F 16/2379 |
| 2021/0224776 A1* | 7/2021 | Hundia | ................ | G06Q 20/223 |

OTHER PUBLICATIONS

Luiz et al., "is an orderer node technically a peer node", pp. 1-8, dated May 13, 2018, downloaded on Feb. 17, 2022 from the Internet, URL: https://lists.hyperledger.org/g/fabric/topic/is_an_orderer_node/19191256 (Year: 2018).*
List of IBM Patents or Patent Applications Treated as Related, Jun. 1, 2019.
Manevich et al., "Malicious Peer Identification for Database Block Sequence", U.S. Appl. No. 16/422,958, filed May 24, 2019.
Biais et al., "The blockchain folk theorem", Swiss Finance Institute Research Paper, (17-75), 2018.
Dempsey, "Preventing replay attacks after the BCH hard fork. source: Poloniex", web article at: https://blog.circle.com/2018/12/07/preventing-replay-attacksafter-the-bch-hard-fork/, 2018.
Finlow-Bates, "Adding Trust to CAP: Blockchain as a Strong Eventual Consistency Recovery Strategy", 2017.
Wikipedia, Merkle Tree, pp. 1-4, dated Jan. 30, 2016, http://web.archive.org/web/20160130124800/https://en.wikipedia.org/wiki/Merkle_tree (Year: 2016).
Office Action issued in the CN Application No. 202010426725.2, dated Jan. 18, 2024.

* cited by examiner

800

MALICIOUS PEER IDENTIFICATION

TECHNICAL FIELD

This application generally relates to methods and systems for detecting malicious orderer or peripheral peers, and more particularly, to database malicious peer identification.

BACKGROUND

A centralized database stores and maintains data in a single database (e.g., a database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage. As such, what is needed is a solution that overcomes these drawbacks and limitations.

SUMMARY

One example embodiment provides a system that includes a blockchain network, comprising one or more of an orderer peer, configured to create and propagate a new block, and one or more peripheral peers, coupled to the orderer peer, each configured to perform one or more of calculate a hash of the new block, determine the calculated hash is different than hashes from a majority of peripheral peers, determine that one or more blocks that correspond to the different hashes from the majority of peripheral peers are different from the new block, and in response cease committing blocks to the blockchain network.

Another example embodiment provides a method that includes one or more of receiving, by each of one or more peripheral peers of a blockchain network, a new block from an orderer peer, calculating a hash of the new block, determining the calculated hash is different than hashes from a majority of peripheral peers, determining that one or more blocks that correspond to the different hashes from the majority of peripheral peers are different from the new block, and in response ceasing committing blocks to the blockchain network.

A further example embodiment provides a non-transitory computer readable medium comprising instructions, that when read by a processor, cause the processor to perform one or more of receiving, by each of one or more peripheral peers of a blockchain network, a new block from an orderer peer, calculating a hash of the new block, determining the calculated hash is different than hashes from a majority of peripheral peers, determining that one or more blocks that correspond to the different hashes from the majority of peripheral peers are different from the new block, and in response ceasing committing blocks to the blockchain network.

DETAILED DESCRIPTION

Figure 1A:
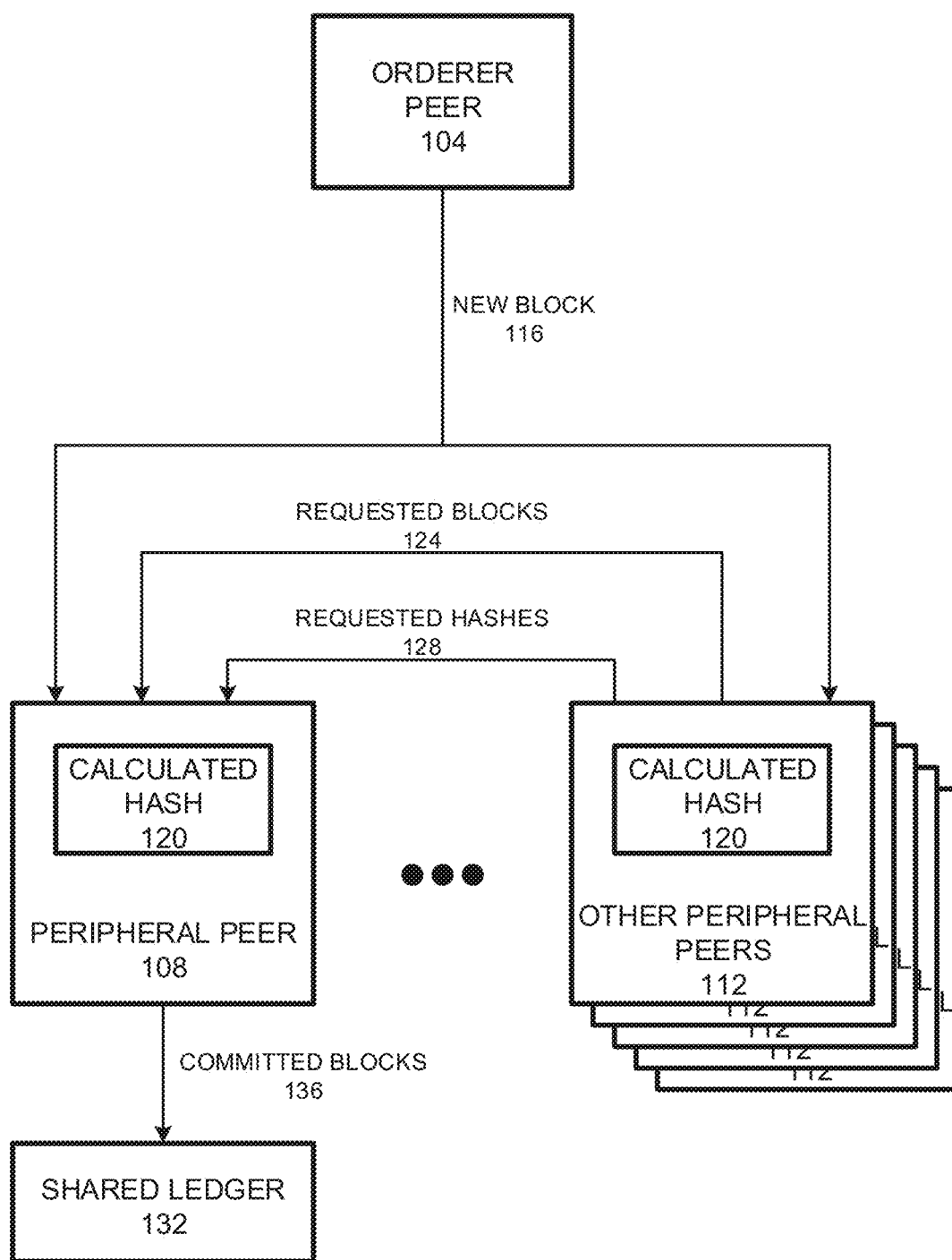
FIG. 1A illustrates a block diagram of a system for processing a new block, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which provide database malicious peer identification.

In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include a novel ability to detect a malicious orderer peer or peripheral peer in a permissioned blockchain network, and a batch process to detect malicious behavior over a group of sequentially consecutive blocks.

It is not possible for the disclosed processes to be implemented on a traditional database instead of a blockchain, because the present processes utilize distributed consensus for new block commitment and shared ledgers to store committed blocks. Traditional databases lack these processes and structures.

The present application creates a functional improvement to computer functionality utilizing the blockchain by detecting a peer that may be acting maliciously to corrupt data or store modified data within a blockchain network. Although permissioned blockchain networks are sometimes thought of as inherently secure, it is still possible for corrupted blocks to be stored to a blockchain during the commitment phase. By detecting corrupted or changed blocks. Network security and integrity is preserved. No new data is stored in blocks of a blockchain.

In a blockchain network, each peer includes a shared ledger, which includes an ordered sequence of transactions that are usually grouped into blocks for efficient dissemination. In some permissioned blockchain networks, there are a set of peers dedicated to order and batch the transactions into blocks (hereafter "ordering peers" or "orderers") and distribute them to the remaining peers (hereafter "peripheral peers") of the blockchain network. The distribution is done by having the peripheral peers pull the blocks from the ordering peers, having the ordering peers send the blocks to the peripheral peers, by an approach that involves one of both the previous approaches, or by an approach that involves a previous approach, but also by having the peripheral peers send each other the blocks and not receiving them directly from the ordering peers.

In most blockchain networks, the transactions sent by the blockchain network participants are signed with asymmetric cryptography, such as (but not limited to) RSA or ECDSA signature schemes. Since the ordering peers lack private keys, they cannot mutate the transactions sent to be ordered while preserving the validity of the signature, because that requires significant computational power.

A threat model to permissioned blockchain networks may consider either malicious ordering peers or malicious peripheral peers. Malicious ordering peers may collude with other ordering peers, present different blocks to peripheral peers, and even collude with peripheral peers (depending on their threat model) on altering their protocol. There is not an upper bound on the percentage of malicious ordering peers. Peripheral peers may be considered honest if they cooperate fully with other peripheral peers, and adhere to the protocols. Peripheral peers may be considered malicious if they may run a modified version of the protocol and attempt to prevent honest peers from discovering that they do not conform to the protocol the honest peers execute.

In Hyperledger Fabric v0.6, the architecture was built around a small core of validator peers connected in a full mesh topology which executed a byzantine consensus protocol (i.e PBFT), and all peers periodically exchanged block hashes via a checkpoint mechanism. The validator peers could use these hashes if they collected f+1 identical hashes of a given sequence number to safely synchronize their own ledger from other peers that published the corresponding hashes after doing backward hash chain validation to ensure the integrity of the block sequence fetched from remote validator peers.

The assumption in Hyperledger Fabric v0.6 was that f is a complete upper bound on the number of byzantine validator peers, so if a validator node received f+1 attestations of the same hash for a given block sequence, it will not reach a forked world state. However, Hyperledger Fabric's v0.6 architecture is fundamentally different than the architecture the present application describes, namely it is a homogenous one and as such it doesn't fit use cases in which there are many peers deployed around a central core of peers which cuts the blocks. In such a layout, the peripheral peers cannot use the mechanism implemented in Hyperledger Fabric v0.6 as a black box, since even if there is an upper bound on the percentage of the malicious peripheral peers, collecting f+1 attestations of the same block hash $H_i$ means nothing because since the blocks aren't cut by peripheral peers, there could be a different group of f+1 peripheral peers which collected attestations on a different block hash $H(j) \neq H(i)$ and thus a chain fork would occur without detection. Additionally, if the Hyperledger Fabric v0.6 mechanism would have been used by the peripheral peers, a fork could still occur without early detection. The Hyperledger Fabric v0.6 protocol and implementation did not relay information transitively between peers but had a point-to-point dissemination only. Thus, it is not practical in large scale deployments, while the present application suggests the use of a gossip protocol combined with signed messages. This allows propagating data in an efficient and scalable manner and adds an ability to detect and expose peripheral peers which voted for two different hashes, and thus disincentivizes such behavior.

The goal of the present application is to detect forking attacks, even if all ordering peers are malicious, as long as they don't coerce the peripheral peers into adopting different blocks. While the ordering peers cannot mutate the transactions that would appear in the blocks (since they lack the private keys of the transaction submitters), they can still harm the integrity of the blockchain by causing chain forks by sending different blocks to different peripheral peers. This may sabotage client applications that read the transactions in the shared ledger by making different clients see a divergent view of the blockchain data.

With a crash fault tolerant (CFT) ordering service, the ability to detect state divergence is a very critical and important property. It may allow publishing an alerting event for an external monitoring system. Moreover, byzantine fault tolerant (BFT) ordering services may mitigate the risk of the chain fork since there may be no guarantee of a number of adversarial ordering service peer growth beyond a threshold of one third of total ordering service network size.

The disclosure herein introduces methods for detecting attempts of a chain fork by peers of the blockchain network 100, under several assumptions.

First, the blocks created by the non-malicious (honest) ordering peers each have a monotonically increasing and successive sequence. The first block is sequenced 0, the next one created is sequenced 1, and so forth. By not creating a block of a specific sequence, a malicious ordering node cannot create a chain fork, because it is equivalent to an honest ordering node that has a crash failure and then recovers. Second, the ordering peers cryptographically sign the blocks they output to the network and each block carries with it an identifier of the node such as (but not limited to) an x509 certificate. The signature may be verified using the identifier, and the identifier itself can be verified by some identity infrastructure such as (but not limited to) a certificate authority validation chain starting at the identifier of the node and ending at a certificate authority that the verifier node trusts.

Third, the peripheral peers may all use the same cryptographic hash function

FIG. 1A illustrates a block diagram of a system for processing a new block, according to example embodiments. Referring to FIG. 1A, the network 100 includes an orderer peer 104, a peripheral peer 108, other peripheral peers 112, and a shared ledger 128. The network 100 is a permissioned blockchain network, such as a Hyperledger Fabric blockchain network.

The protocol herein uses thresholds of a total node count of the blockchain network 100, which implies that the peers are countable and how many peers there are is a known number. In a public blockchain network such as bitcoin, the number of nodes there are is never known, and a threshold on the percentage of byzantine nodes (denoted herein as f) doesn't exist because a malicious party can join as many nodes as it wants into the blockchain network by generating identities for its nodes, and run more than f nodes on its own.

The orderer peer 104 receives endorsed blockchain transactions from other peers within blockchain network 100 and gathers groups of transactions into new blocks 116. Although one orderer peer 104 is illustrated, it should be understood there may be any number of orderer peers 104 in the blockchain network 100. One orderer peer 104 is shown in order to simplify the description of the network 100 and aid in understanding of the disclosed processes. When the orderer peer 104 creates a new block 116, it transfers the new block 116 to peripheral peers 108, 112 of the blockchain network 100. Peripheral peers 108, 112 are all other peers of the blockchain network 100 that are not orderer peers 104, and may be generally considered to be blockchain peers.

In the disclosed processes, all peripheral peers 108, 112 of the network 100 operate the disclosed processes in parallel. However, the description and processes focus on what happens within an individual peripheral peer (peripheral peer 108) and how it cooperates with the other peripheral peers 112 in the network. It should therefore be understood that the operations discussed with respect to peripheral peer 108 are at the same time occurring in each of peripheral peers 112. There may be any number of peripheral peers 108, 112 in the blockchain network 100.

In response to receiving the new block 116, the peripheral peer 108 calculates a hash 120 of the new block 116. At the same time, the peripheral peer 108 requests hashes of the new block 116 from a majority of the peripheral peers 112 in the blockchain network 100. Each of the other peripheral peers 112 do the same. The peripheral peer 108 receives the requested hashes 128 from the majority of other peripheral peers 112, and compares the requested hashes 128 to the calculated hash 120. If all of the requested hashes 128 are the same as the calculated hash 120, then the new block 116 is valid and the peripheral peer 108 includes the new block as a committed block 136 stored to a shared ledger 132 of the blockchain network 100. If one or more of the requested hashes 128 are not the same as the calculated hash 120, then most likely the orderer peer 104 that created the new block 116 is possibly malicious.

The peripheral peer 108 next verifies whether the orderer peer 104 is malicious by requesting the new block from each of the peripheral peers 112 that provided a requested hash 128 that miscompared with the calculated hash 120. Those peripheral peers 112 provide the requested block 124 to the peripheral peer 108, who then compares the requested block 124 to the new block 116 the peripheral peer 108 received. If the requested blocks 124 are not the same as the new block 116, then the orderer peer 104 that created the new block 116 is a malicious orderer peer 104.

Honest peripheral peers 108, 112 (that do not participate in the ordering of the transactions) have no incentive to lie to each about blocks they receive from the ordering peers 104, because it is of interest to the peripheral peers 108, 112 to have the same shared ledger 132 contents since they do not collude with the ordering peers 104. Also, each peer could be asked to prove its assertion about a block by sending the block itself, and thus exposing its lie since the block is signed by the ordering node(s) 104. Therefore, in any environment in which the peripheral peers 108, 112 can lie about the blocks they receive from the ordering peers 104, a separate protocol that requests a proof by receiving these blocks from peripheral peers 108, 112 may be run alongside the protocol outlined herein. In the case of malicious peripheral peers 108, 112, they may lie to honest peers and possibly collude with the ordering peers 104 or other peripheral peers 108, 112 to cause different honest peers to adopt blocks that contain different transactions or blocks with the same transactions but in different order. It is considered acceptable that malicious peers adopt different blocks than honest peers, but all honest peers must adopt the same blocks.

The number of malicious peripheral peers 108, 112 in the blockchain network cannot exceed a certain (publicly known) percentage of total peripheral peers. Specifically, an upper bound on the number of possible malicious peripheral peers 108, 112 in the network is known and is denoted herein as f. The peripheral peers 108, 112 all share a common number B that is known to everyone in the blockchain network 100. Peers arrange blocks received from the ordering peers 104 in batches of size B. If a peer has not received a block $b_i$ but did receive a block $b_j$ for some j>i, it is guaranteed to receive $b_i$ eventually from either an ordering peer 104 or a peripheral peer 108, 112. In addition, the peripheral peers 108, 112 all share a common duration of time $T_{out}$ that is known to all entities within the blockchain network 100.

Data structures of the present application may reside in memory or on a disk or on any type of storage or a mix of storage devices. The peripheral peers 108, 112 all maintain the blocks in a successive and continuous ordered list of blocks starting from 0 up to the latest block received. A hash of the blocks of the list are used as leaves in a merkle tree 154, and each time a block is received and validated, the merkle tree 154 is reconstructed and recomputed at each peripheral peer 108, 112. The peripheral peers 108, 112 continually notify each other of their latest validated and non-validated block sequences. A validated block is considered a block that has been stored to the shared ledger 132 and is a leaf in the merkle tree 154, and a non-validated block is one that is not. Since blocks enter the shared ledger 132 in-order, if $b_j$ is a validated block, then $\forall i \in \{0 \ldots j\}$: bi is also validated.

Peers consult with a threshold count (hereafter t) of other peripheral peers 108, 112 in order to withstand scenarios in which either an ordering peer 104 publishes different blocks to different peers, or malicious peripheral peers 108, 112 (if applicable) do not conform to their protocol in order to cause honest peers to adopt divergent sets of blocks. The threshold count t that a peer needs to consult with depends on the threat model. For honest peripheral peers 108, 112, the threshold count t may include at least 50% of the total peripheral peers 108, 112 out of all peripheral peers 108, 112, which means that including the peer itself, is at least 50%+1. For malicious peripheral peers 108, 112: (reminder: the upper bound on the malicious peer count is denoted as f=at least 50%+f of the total peripheral peer 108, 112 count out of all peripheral peers 108, 112, which means that including the peer itself, is at least 50%+f+1. Peers do not need to directly communicate with each other to collect a threshold count of hashes, but can also sign the data they want to publish and propagate this among the peripheral peers 108, 112 in a dissemination protocol such as (but not limited to) gossip, broadcast, etc.

As described previously, peers arrange blocks received from the ordering service in batches of size B. If a peer hasn't received a block bi but did receive a block bj for some j>i, it is guaranteed to receive $b_i$ eventually from either an ordering peer 104 or a peripheral peer 108, 112. It follows from here that if a peer received all blocks in a batch of blocks $b_{i-B}, b_{i-B+1}, \ldots, b_{(i+1)-B-1}$ but a set of blocks $b_j, \ldots, b_{j+k}$ s.t $j+k<(i+1)\cdot B-1$, it will obtain the missing blocks eventually.

However, if there is a consecutive set of indices that the last of them is $(i+1)\cdot B-1$ that are missing, there is (obviously) no guarantee that the peer would receive them at all, since it may be that this is the last batch that is being received, and no new blocks have been created by any ordering peer 104. In this case, then $T_{out}$ denotes the time limit a peer would wait until it would decide to perform step (2) of the protocol.

The protocol itself is described algorithmically as follows:
1. On reception of B blocks $b_i, b_{i+1}, \ldots, b_{i+B-1}$ by peripheral peer p:
    Consult t peripheral peers (denote the set of peers Q) of their non-validated block sequences and validated block sequences.
    a. If t peers with a validated sequence of blocks $b'_i, b'_{i+1}, \ldots, b'_{i+B-1}$, weren't found, retrieve from t peers the hashes $H(b_i), H(b_{i+1}), \ldots, H(b_{i+B-1})$ that they have received, if applicable. If $\exists j \in [i, \ldots i+B-1]$ s.t $H(b_j) \neq H(b'_j)$, then a fork has been detected. If such t hashes haven't been collected—go back to step (1).
    b. As explained, if there is a node $q \in Q$ with a sequence of blocks $b_i, b_{i+1}, \ldots, b_{i+B-1}$, it means it has constructed a merkle tree that includes these blocks in its lowest level (leaf level). Obtain from q the root hash $R_B^q$ of a merkle tree that its leaves are the hashes $H(b_i), H(b_{i+1}), \ldots H(b_{i+B-1})$ (as explained, q maintains such a merkle tree, and since $r_B$ solely depends on $b_i, b_{i+1}, \ldots, b_{i+B-1}$, it will stay the same no matter what is q's ledger height),
    c. Construct a temporary merkle tree that its leaves are $b_i, b_{i+1}, \ldots, b_{i+B-1}$ and its root is $r_B$, and compare it with $R_B^q \forall q \in Q$.
        i. If $\exists q \in Q$ s.t $r_B \neq r_B^q$, it means there is some block $b_j$ s.t $i \leq j \leq i+B-1$ in p that is different than the blocks in q, and thus a chain fork has been successfully detected.
        ii. Else, consider $b_i, b_{i+1}, \ldots, b_{i+B-1}$ validated, commit them to the shared ledger, and update the merkle tree.
2. If B blocks aren't received from the blockchain network 100 within a timely manner $T_{out}$:
    a. Let $b_i, b_{i+1}, \ldots b_{i+k}$ s.t k<B-1 be the last blocks received from the blockchain network 100.
    b. Define blocks $z_{i+k+1} \ldots z_{i+B-1}$ as blocks that are missing from the last batch, and denote their hashes as 0.
    c. Perform the protocol of step (1) with the blocks while consulting t peripheral peers, with the blocks $b_i, b_{i+1}, \ldots, b_{i+k}, z_{i+k+1}, \ldots, z_{i+B-1}$, but when contacting the other peers, specify the indices i+k, . . . i+B-1 in case the contacted peer q has received new blocks at the time of the query.

Note: Step 1 may also be performed by sending a merkle tree root which its leaves are the hashes of the blocks $b'_i, b'_{i+1}, \ldots, b'_{i+B-1}$, but for simplicity and easy distinguishability between validated blocks that are committed and have a merkle tree built for them and non-validated blocks, the protocol doesn't use a merkle tree for step 1a. Also, a merkle tree method may be replaced with a cumulative hashing that is defined in the following way: $H(H(b_i)\|H(b_{i+1}) \ldots \|H(b_{B+1-1}))$ or by a similar method.

As peripheral peers consult each other about their block hashes, they can either adopt their block hashes, or detect a chain forking attempt. The blocks may be modeled as values that peripheral peers input into the protocol and the output is either the blocks they propose or an event of a forking attempt.

The disclosed protocol fulfills the properties of abortable consensus.

Uniform validity teaches: "If a process decides v then some process previously proposed v". Therefore, if a peripheral peer adopts a certain block, it means that there are t other peripheral peers that also proposed that block either in the past (it was validated) or in the current round (the block wasn't validated before by any peripheral peer).

Agreement teaches: "Correct processes do not decide different values". Therefore, assume in contradiction that there are 2 peripheral peers p and q such that p adopted block bi with hash Hp and q adopted block bi with hash Hq. Since every peripheral peer consults with at least 50%+f other peripheral peers, there is an honest peripheral peer r that both p and q consulted with. From the assumption and the protocol, it follows that r communicated q its hash of bi is Hq and communicated p its hash of Bi is Hp. Therefore, r doesn't conform to the protocol and hence is malicious, which indicates a contradiction.

Termination teaches: "Eventually all correct processes either decide or abort". It may be easily derived from the protocol, that for each block a peripheral peer consults with other peers about, it is either informed about only the hash it computed for the block itself, or is informed about a different hash and then it aborts the protocol because a chain split attempt was detected.

α—Abortability teaches: "There exists an α<1 such that for any failure pattern in which most of processes are correct, the probability that there exists some process that aborts in a run with the failure pattern is at most α". Denote the number of peripheral peers as n and the amount of malicious peripheral peers as f, such that 2f<n. Let p be a peripheral peer. For simplicity of calculation, assume that it consults with exactly (instead of at least) n/2+f other peripheral peers about the blocks it possesses. The probability of selecting only honest peripheral peers is:

$$phonest = (n - f - \ln 2 + f - 1)(n - \ln 2 + f - 1),$$

and since every peripheral peer selects independently, the probability of all honest peripheral peers do not select any malicious peripheral peer for a given block batch is:

$$(phonest)^{n-f},$$

which means the probability α that some process aborts in a run is at most:

$$\alpha = 1 - (phonest)^{n-f}$$

Figure 1B:
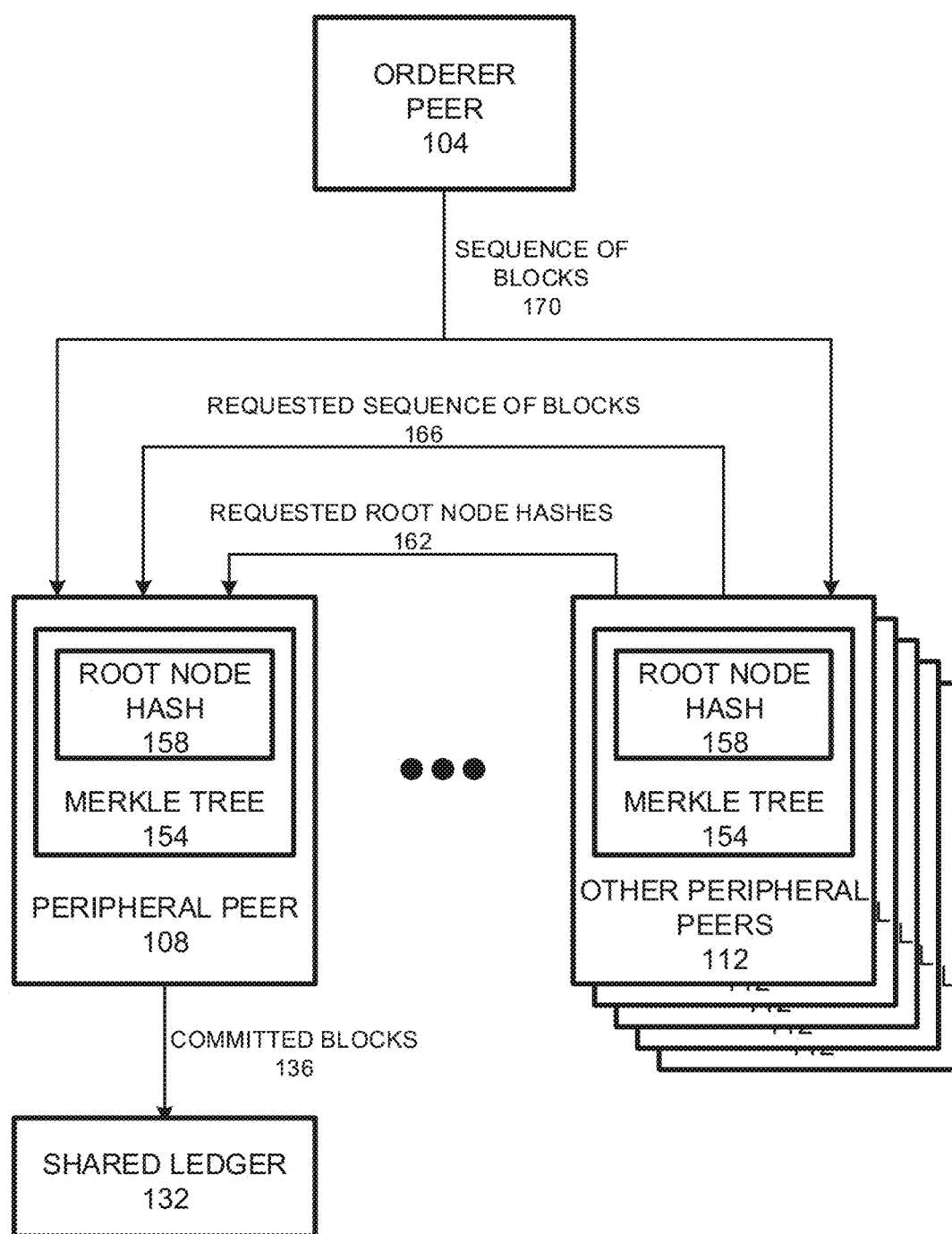
FIG. 1B illustrates a block diagram of a system for processing a new block sequence, according to example embodiments.

FIG. 1B illustrates a block diagram of a system for processing a new block sequence, according to example embodiments. Referring to FIG. 1B, the network 150 includes the same peers 104, 108, 112 and shared ledger 132 described with respect to FIG. 1A, but represents a system 150 where a sequence of blocks 170 are processes instead of a single block 116. A sequence of blocks 170 is a group of two or more consecutive blocks.

To make the protocol more efficient, network bandwidth should be conserved and the amount of data transferred should preferably be minimized. To that end, the blocks are arranged into batches of some globally known batch size B, and for every such batch of blocks or sequence of blocks 170, a merkle tree 154 is created, where the leaf nodes of the merkle tree 154 are the block hashes of the batch. In order for two peripheral peers 108, 112 to compare all hashes of the blocks in the batch, it is only necessary to compare the root node hash 158 of the merkle tree 154. Assuming the hash function of the merkle tree is collision resistant, all block hashes of the batch are the same if and only if the merkle tree root hashes 158 in possession of the two peripheral peers 108, 112 are equal. This saves network bandwidth and is more efficient than comparing a block at a time as in FIG. 1A because the same merkle tree root node hash 158 may be sent to all the peripheral peers 108, 112 in the blockchain network 150.

However, there is a corner case that needs to be addressed: Since a blockchain increments blocks one by one, and not in batches, it may be that too much time (denoted as $T_{out}$ herein) has passed, yet the blockchain network 150 may not have enough blocks to fill in a batch of B blocks. In such a case, the peripheral peers 108, 112 simply fill in the remaining vacant places in the batch with hashes of zeros, compute a merkle tree root node hash 158, and send it to the peers along with the indices that were zeros instead of actual block hashes.

Each peripheral peer 108, 112 includes a merkle tree 154. The merkle tree 154 includes leaf nodes that each store a hash for a block. The merkle tree 154 has a root node, which stores a root node hash 158 for the entire merkle tree 154. Thus, by comparing root node hashes 158, a peripheral peer 108, 112 may determine that two or more merkle trees 154 are identical.

If the merkle trees 154 are constructed on hashes of blocks that have been validated (committed), then when receiving blocks that have not been validated—their hashes may be sent and consulted with peripheral peers 108, 112 in the same manner as before. Otherwise, if the merkle trees 154 are constructed on hashes of blocks regardless of their validation, then when receiving blocks that have not been validated, the merkle tree 154 needs to be constantly updated along with the merkle tree 154. The peer sends also the range of the consecutive prefix of blocks that are not zeros (in order for the other peripheral peer 108, 112 to understand which leaves correspond to blocks that are not included in the merkle tree 154 construction).

In response to receiving the sequence of blocks 170, the peripheral peer 108 adds the sequence of blocks 170 to its own merkle tree 154 by calculating hashes for each block of the sequence of hashes 170 and storing the calculated hashes to leaf nodes of its own merkle tree 154. At the same time, the peripheral peer 108 requests root node hashes 158 from a majority of the peripheral peers 112 in the blockchain network 100, of their own merkle tree 154. Recall that each peripheral peer 108, 112 is executing the steps in parallel, including updating its own merkle tree 154 with hashes from the sequence of blocks 170. The peripheral peer 108 receives the requested root node hashes 162 from the majority of other peripheral peers 112, and compares the requested root node hashes 128 to its own root node hash 158. If all of the requested root node hashes 162 are the same as the root node hash 158 of the peripheral peer 108, then the sequence of blocks 170 is valid and the peripheral peer 108 includes the sequence of blocks 170 as committed blocks 136 stored to the shared ledger 132 of the blockchain network 100. If one or more of the requested root node hashes 162 are not the same as the root node hash 158 of the peripheral peer 108, then most likely the orderer peer 104 that created the sequence of blocks 170 is possibly malicious.

The peripheral peer 108 next verifies whether the orderer peer 104 is malicious by requesting the sequence of blocks from each of the peripheral peers 112 that provided a requested root node hash 162 that miscompared with the root node hash 158 of the peripheral peer 108. Those peripheral peers 112 provide the requested sequence of blocks 166 to the peripheral peer 108, who then compares the requested sequence of blocks 166 to the sequence of blocks 170 the peripheral peer 108 received. If the requested sequence of blocks 166 are not the same as the sequence of blocks 170, then the orderer peer 104 that created the sequence of blocks 170 is a malicious orderer peer 104.

Figure 2A:
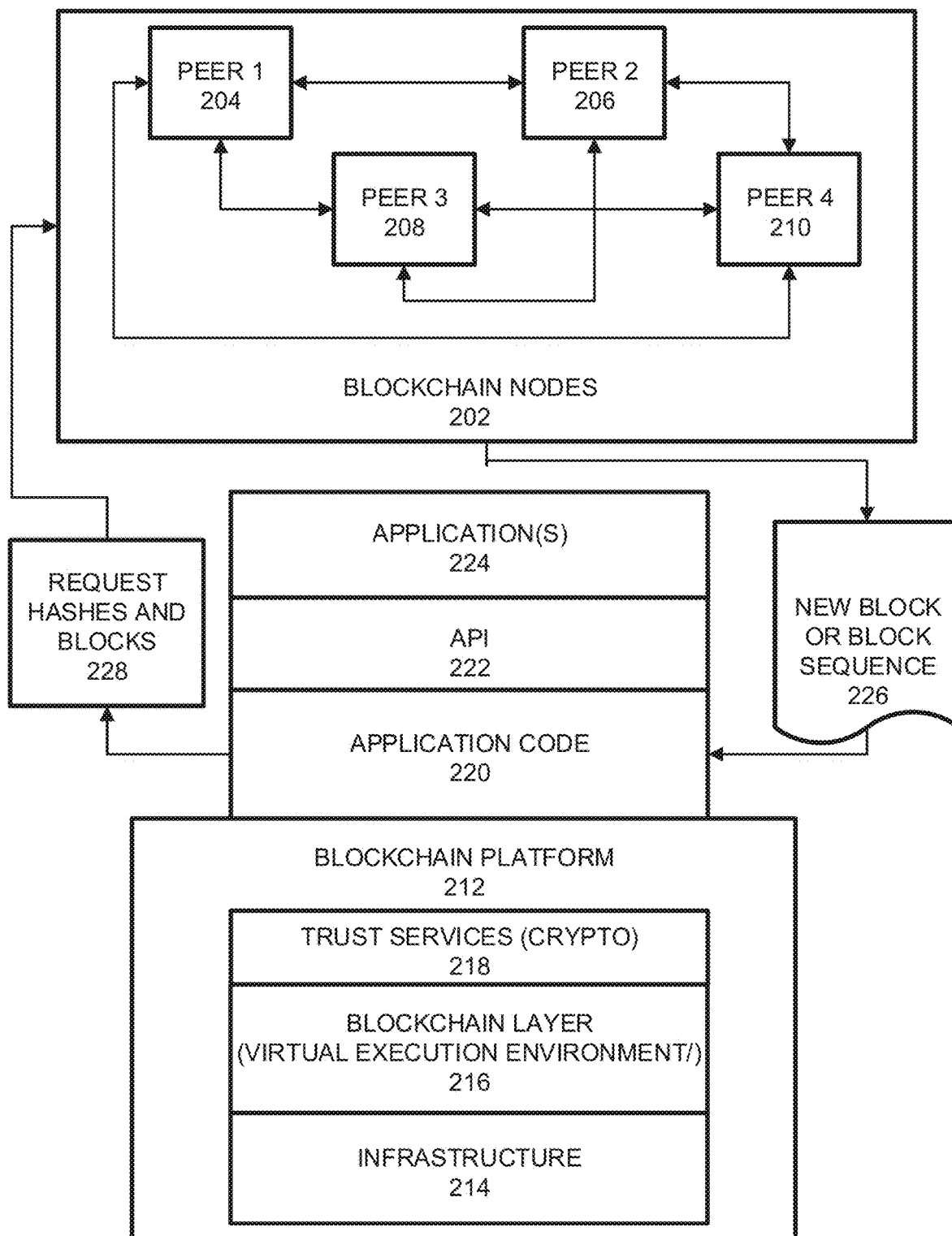
FIG. 2A illustrates an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226 may include a new block or a new block sequence from an orderer peer, and may be processed by one or more processing entities (e.g., virtual machines) included in the blockchain layer 216. The result 228 may include a request to other peripheral peers to provide hashes and blocks in order to make comparisons to detect malicious behavior. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
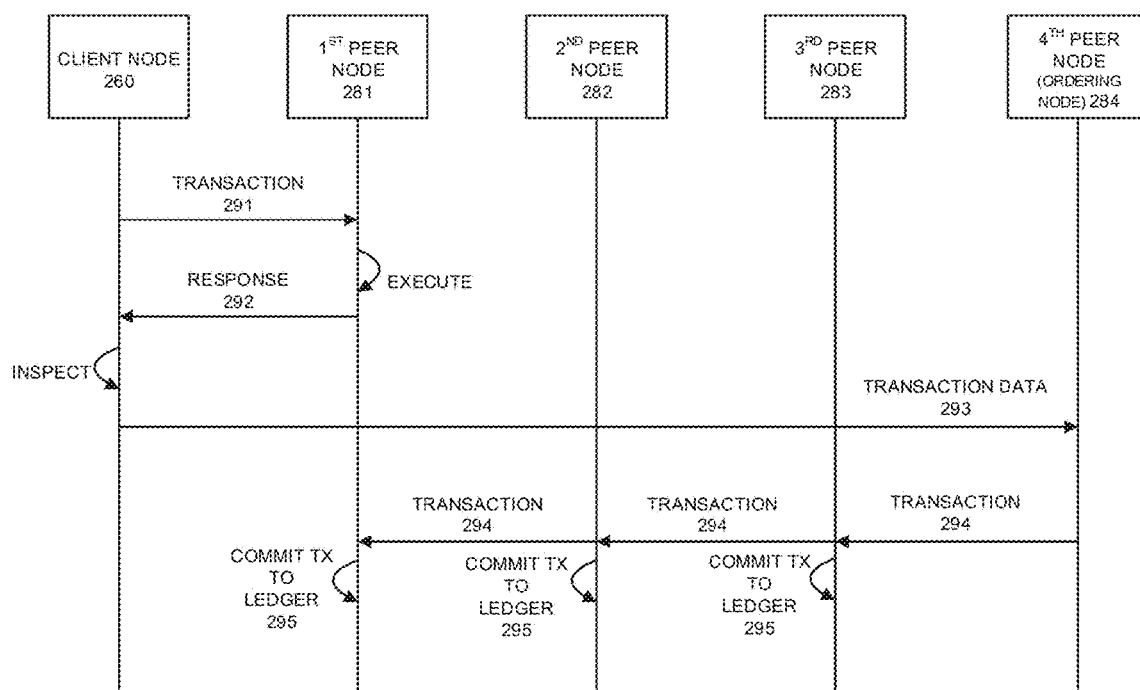
FIG. 2B illustrates a blockchain transactional flow, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3A:
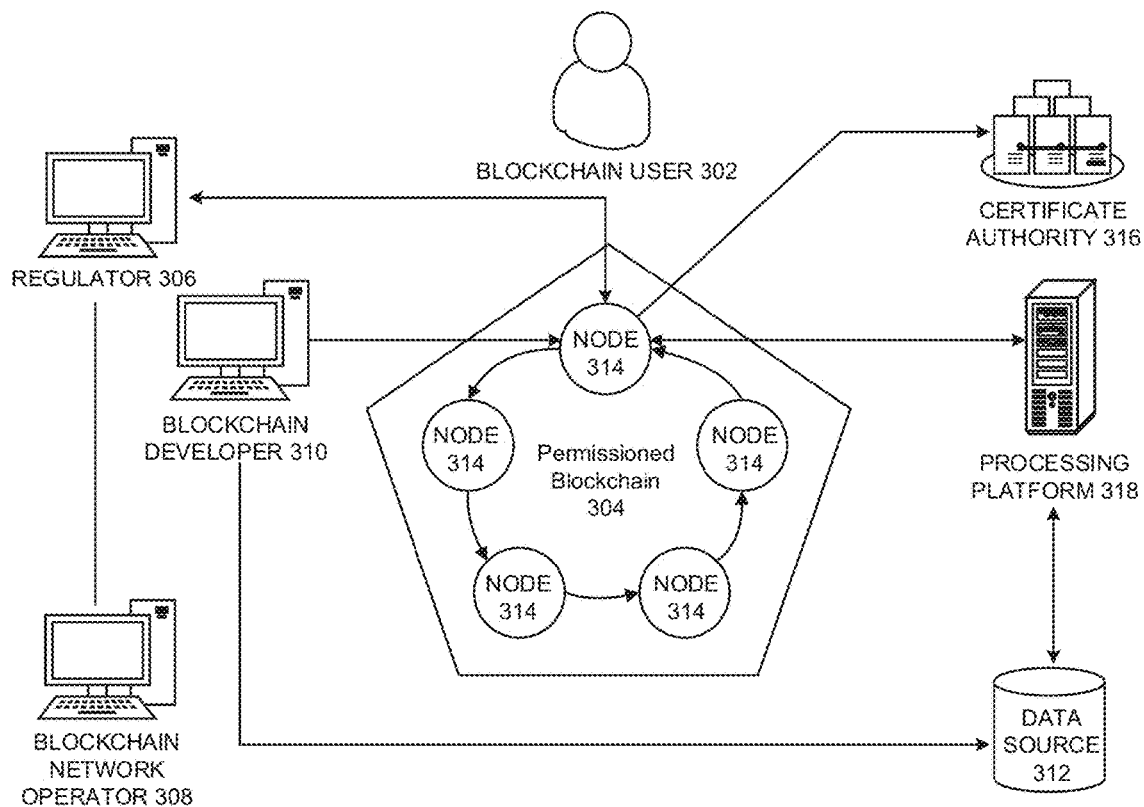
FIG. 3A illustrates a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
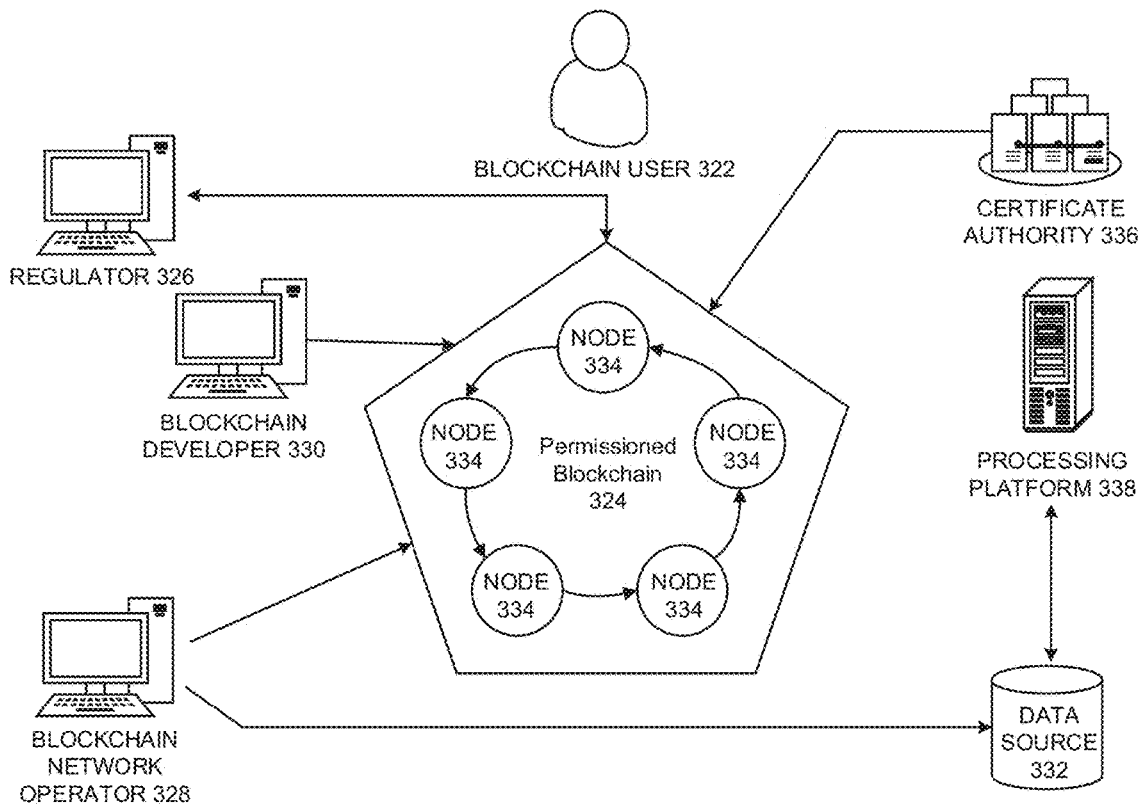
FIG. 3B illustrates another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
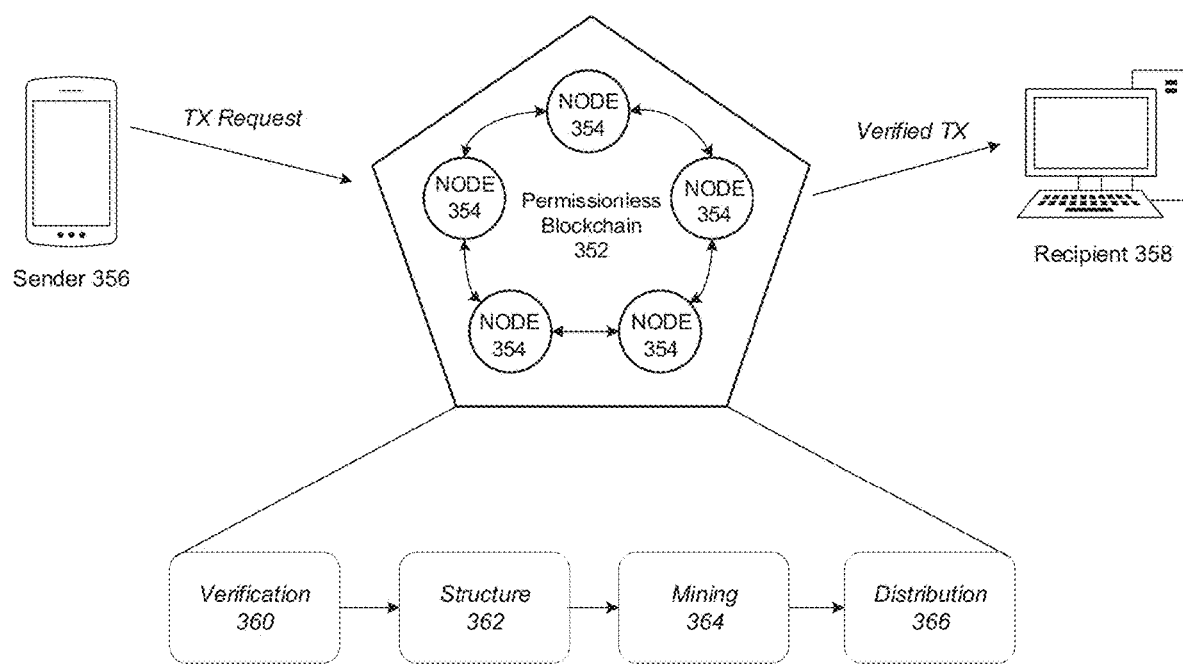
FIG. 3C illustrates a permissionless network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc.

The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 4:
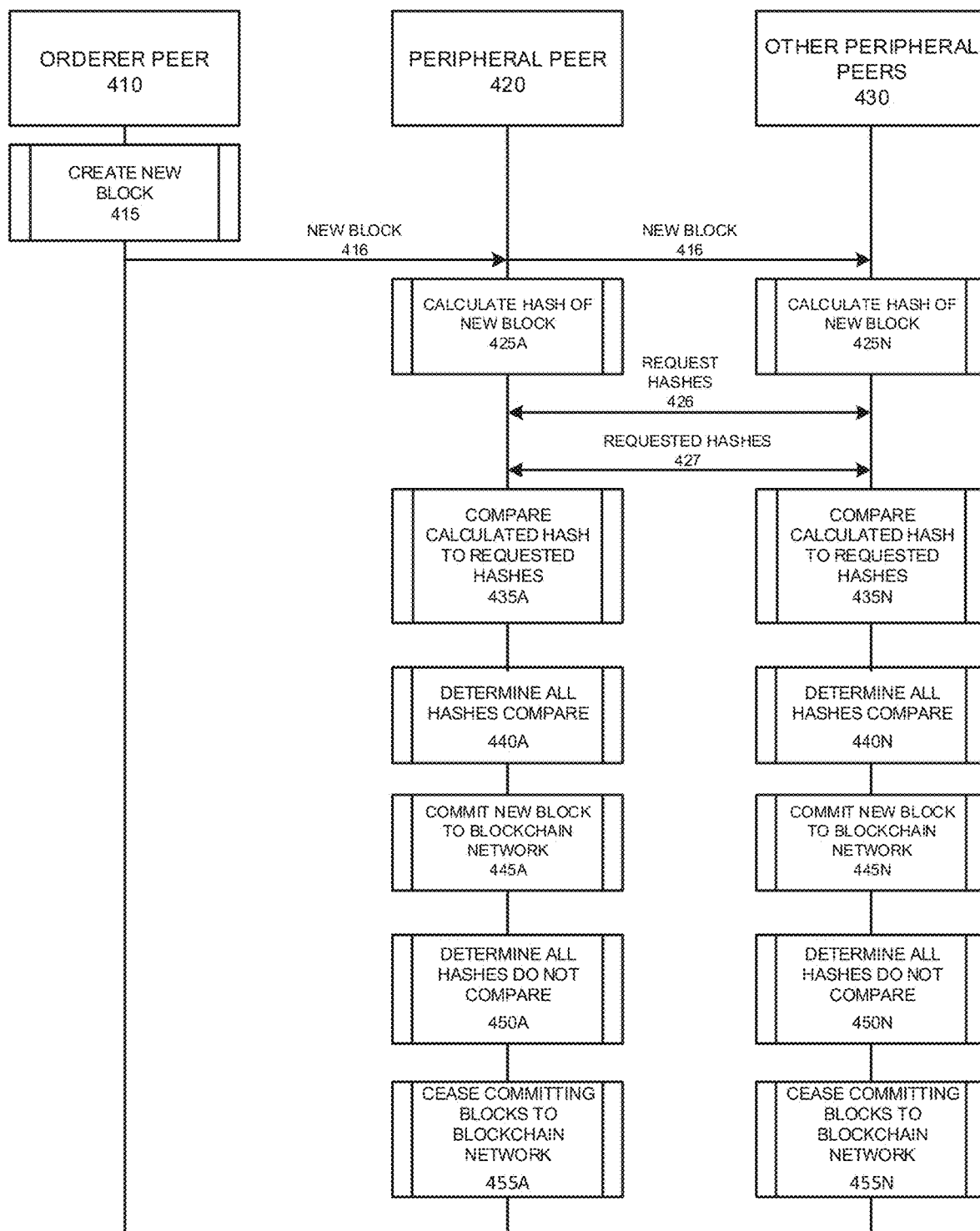
FIG. 4 illustrates a system messaging diagram for performing block integrity checking, according to example embodiments.

FIG. 4 illustrates a system messaging diagram 400 for performing block integrity checking, according to example embodiments. Referring to FIG. 4, the system diagram 400 includes an orderer peer 410, a peripheral peer 420 and other peripheral peers 430.

The orderer peer 410 creates a new block 415, and distributes the new block 416 to the peripheral peer 420 and other peripheral peers 430. The peripheral peer 420 calculates a hash of the new block 425A in parallel with the other peripheral peers 430 calculating a hash of the new block 425N. The peripheral peer 420 transfers a request 426 to the other peripheral peers 430 to provide hashes of the new block 416. As described with respect to FIG. 1A, the other peripheral peers 430 conduct the same processes in parallel. Thus, the same processes performed by the other peripheral peers 430 are represented by an "N" suffix, while those processes performed by the peripheral peer 420 are represented by an "A" suffix. The request hashes 426 and requested hashes 427 are both represented with bidirectional arrows to additionally represent this parallelism. However, only the blocks executed by the peripheral peer 420 are specifically discussed herein. The other peripheral peers 430 constitute a majority of the peripheral peers in the network.

In response to receiving the request 426, each of the other peripheral peers 430 provides the requested hashes 427 to the peripheral peer 420. The peripheral peer 420 compares the calculated hash to the requested hashes 435A, and determines if all of the requested hashes are identical to the calculated hash 440A. If all of the requested hashes are identical to the calculated hash 440A, the peripheral peer 420 commits the new block to the blockchain network 445A. Next, the peripheral peer 420 determines that all of the requested hashes are not identical to the calculated hash 440A (i.e. a miscompared has occurred) 450A. In this case, the peripheral peer 420 ceases committing new blocks to the blockchain network 455A.

Figure 5A:
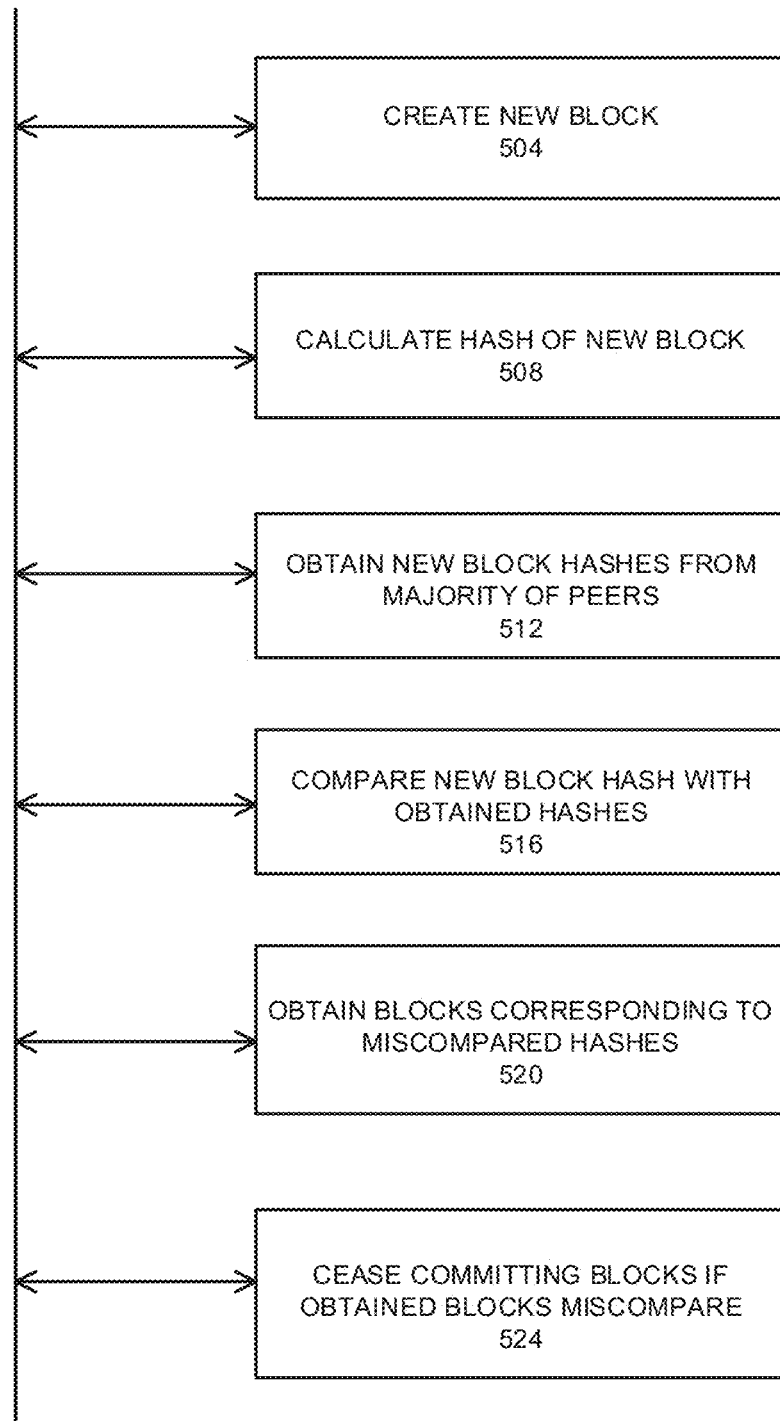
FIG. 5A illustrates a flow diagram of an example method of verifying a new block in a blockchain, according to example embodiments.

FIG. 5A illustrates a flow diagram 500 of an example method of verifying a new block in a blockchain, according to example embodiments. Referring to FIG. 5A, the method 500 may include one or more of the following steps.

At block 504, an orderer peer creates a new block, and distributes the new block to peers of the blockchain network.

At block 508, peripheral peers of the blockchain network calculate a hash of the new block.

At block 512, each of the peripheral peers obtain new block hashes from a majority of peripheral peers of the same blockchain network.

At block 516, each peripheral peer compares the calculated new block hash with the obtained hashes from the majority of peripheral peers.

At block 520, if any of the hashes miscompared, each of the peripheral peers that observed a miscompare obtains blocks corresponding to the miscompared hashes from those peripheral peers that supplied the miscompared hashes.

At block 524, the peripheral peer ceases committing blocks if any of the obtained blocks miscompared to the new block. This signifies that a malicious orderer peer created a bad block.

Figure 5B:
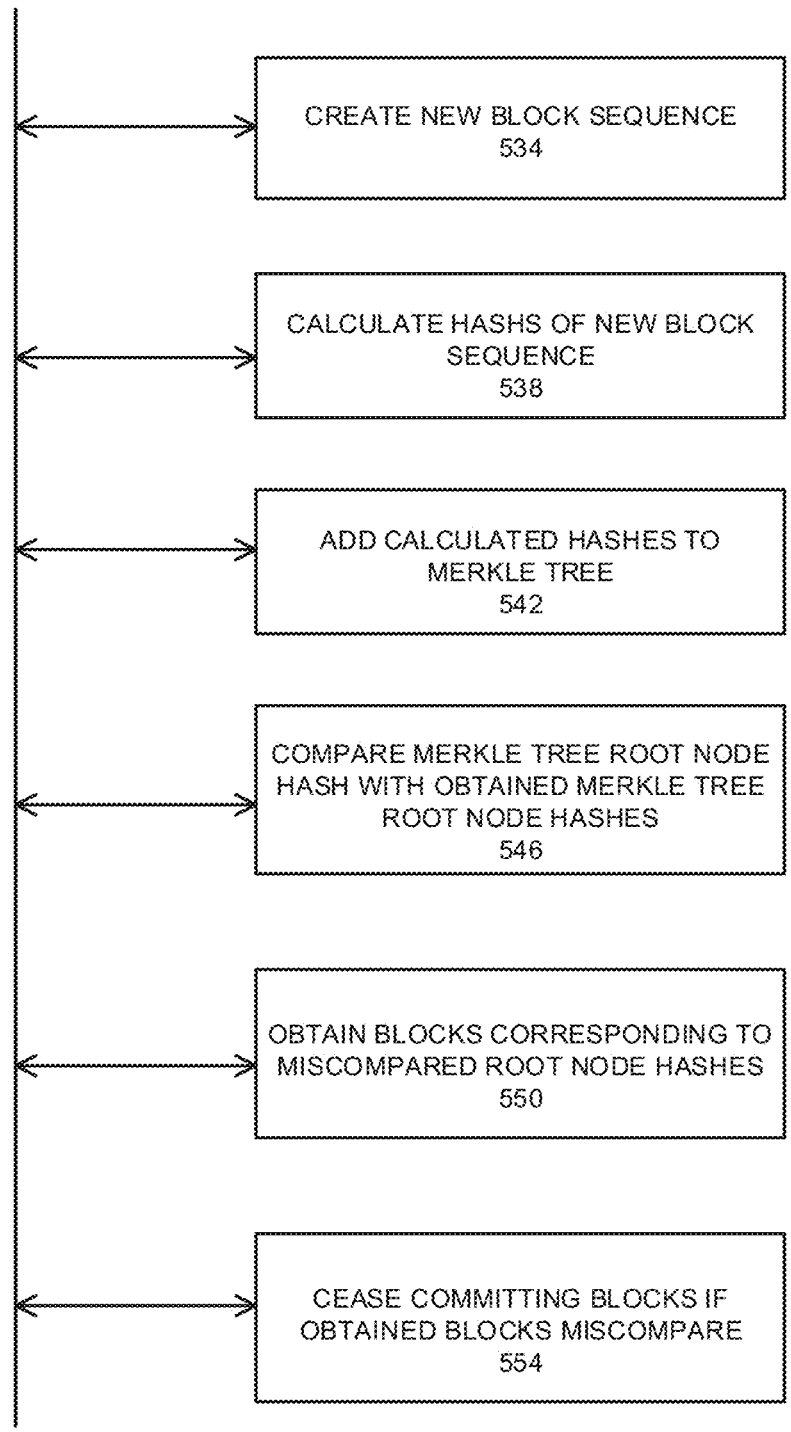
FIG. 5B illustrates a flow diagram of an example method of verifying a sequence of blocks in a blockchain, according to example embodiments.

FIG. 5B illustrates a flow diagram 530 of an example method of verifying a sequence of blocks in a blockchain, according to example embodiments. Referring to FIG. 5B, the method 530 may include one or more of the following steps.

At block 534, an orderer peer creates a sequence of blocks, and distributes the new sequence of blocks to peers of the blockchain network.

At block 538, peripheral peers of the blockchain network calculate hashes of the new sequence of blocks.

At block 542, each of the peripheral peers adds the calculated hashes to its own merkle tree, where each leaf node of the merkle tree stores a hash of a different block.

At block 546, each peripheral peer requests merkle tree root node hashes from a majority of other peripheral peers of the blockchain network. Each peripheral peer compares its own merkle tree root node hash to merkle tree root node hashes it receives from the other peripheral peers it sent the request to.

At block 550, if any of the root node hashes miscompared, each of the peripheral peers that observed a miscompare obtains sequences of blocks corresponding to the miscompared root node hashes from those peripheral peers that supplied the miscompared root node hashes.

At block 554, the peripheral peer ceases committing blocks if any of the obtained sequence of blocks miscompared to the new sequence of blocks. This signifies that a malicious orderer peer created a bad sequence of blocks.

Figure 5C:
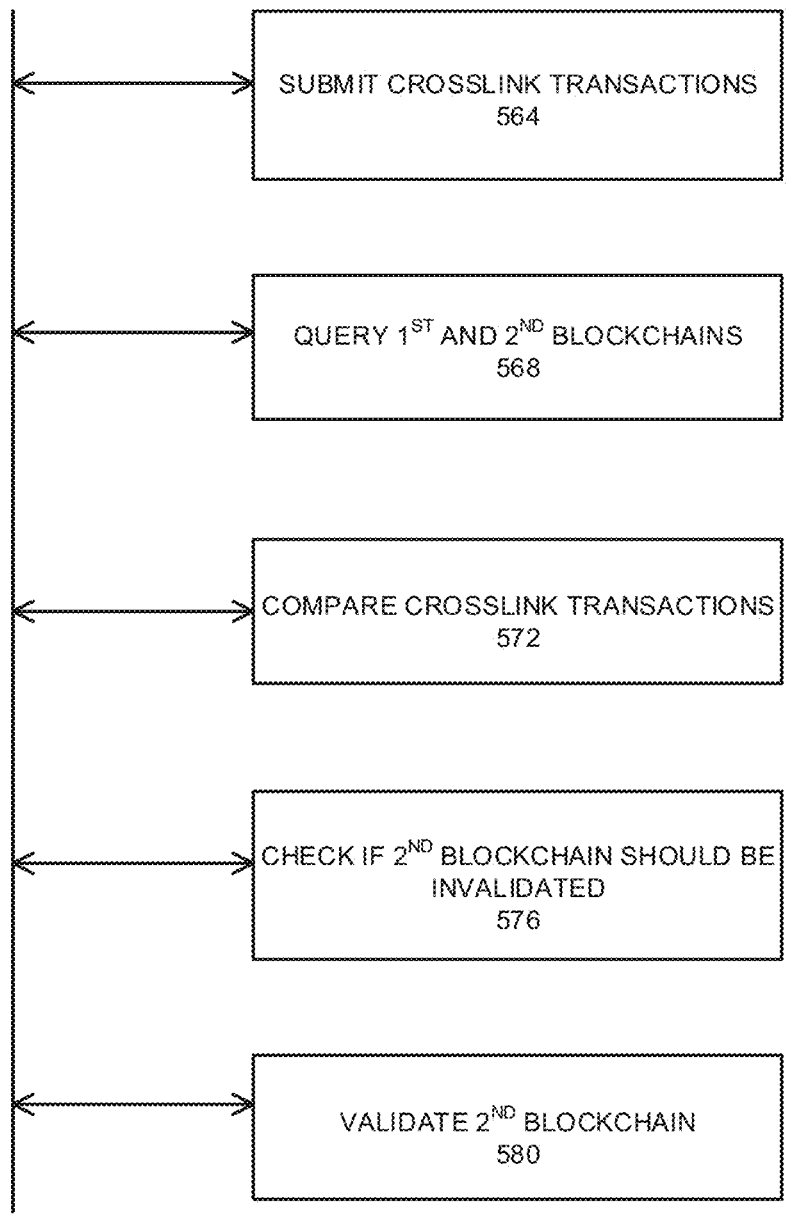
FIG. 5C illustrates a flow diagram of an example method of preventing vulnerabilities in a blockchain, according to example embodiments.

FIG. 5C illustrates a flow diagram 560 of an example method of preventing vulnerabilities in a blockchain, according to example embodiments. Referring to FIG. 5C, the method 560 may include one or more of the following steps.

At block 564, crosslink transactions are submitted. A first crosslink transaction is submitted for addition to a first blockchain and a second corresponding crosslink transaction is submitted for addition to a second blockchain, e.g., by a computing device associated with a party or user of the first and second blockchains. For example, the first crosslink transaction may be submitted to nodes associated with blockchain A for addition to blockchain A and the second crosslink transaction may be submitted to nodes associated with blockchain B for addition to blockchain B. In some aspects, for example, the user may submit the corresponding crosslink transactions when the user anticipates that one of blockchains A and B may become quiescent in the future. In some aspects, for example, the corresponding crosslink transactions may be submitted at the same time. In some aspects, for example, the first and second crosslink transactions may be submitted to the first and second blockchains at about the same time, e.g., within a few seconds, minutes, or hours of each other. In some aspects, one of the crosslink transactions may first be submitted to the blockchain that has a higher rate of block additions followed by the submission of the other crosslink transaction to the blockchain that has a lower rate of block additions. For example, the busiest blockchain may receive the submission of the crosslink transaction first followed by the less busy blockchain. In some aspects, for example, once the crosslink transaction has been confirmed as present in a new block on the busiest blockchain, the corresponding crosslink transaction may be submitted to the less busy blockchain. In some aspects, for example, this may be reversed where the crosslink transaction may be submitted to the less busy blockchain first followed by the busiest blockchain second.

At block 568, $1^{st}$ and $2^{nd}$ blockchains are queried. A computing device of a user, e.g., the same user or another user of one or both of blockchains A and B, may query the first blockchain, e.g., blockchain A for the first crosslink transaction. This user may query blockchain A, for example, in response to blockchain B entering a period of quiescence. For example, the user may initially determine that blockchain B has entered a period of quiescence and may know or identify that blockchains A and B have been crosslinked through crosslink transactions. For example, the user may determine that blockchains A and B have been crosslinked by querying blockchain B to see if there were any past crosslink transactions and identifying blockchain A as a blockchain having had a corresponding crosslink transaction to one found in blockchain B. The computing device of the user may identify the second blockchain, e.g., blockchain B, based on the queried first crosslink transaction, for example, by viewing the ID to blockchain B (FIG. 4). The computing device of the user may query the second blockchain for the corresponding second crosslink transaction based on the identification of the second blockchain based on the first crosslink transaction.

At block 572, the crosslink transactions are compared. If the second crosslink transaction is present in the second blockchain, the second crosslink transaction may be compared to the first crosslink transaction to determine whether the second crosslink transaction corresponds to the first crosslink transaction. For example, transaction digests may be accessed or decoded using a public key of the user that submitted the crosslink transactions. If the transaction digests are decoded using the same public key, the crosslink transactions may be validated since it has been confirmed that the same user submitted both crosslink transactions.

At block 576, a check is made to determine if the $2^{nd}$ blockchain should be invalidated. The computing device of the user may determine based on a result of the query whether the corresponding second crosslink transaction is or is not present. If the second crosslink transaction is not present in the second blockchain, at least a portion of the second blockchain may be invalidated. For example, the lack of the second crosslink transaction may be an indication that at least part of the second blockchain has been modified or tampered with. In some aspects, the user may utilize prior corresponding crosslink transactions of the first and second blockchains to validate at least a portion of the blockchain. For example, if a crosslink transaction is missing for blockchain B, the user may instead try to validate at least the portion of blockchain B ending at the corresponding crosslink transaction.

At block 580, the $2^{nd}$ blockchain is validated. If the second crosslink transaction is determined to correspond to the first crosslink transaction based on the comparison, the second blockchain may be validated. Alternatively, if the second crosslink transaction is determined to not correspond to the first crosslink transaction, the second blockchain may be invalidated. For example, if the public key does not decode one or both of the transaction digests, the user will know that at least one of the crosslink transactions was not submitted by the same user and therefore that the second crosslink transaction is invalid as evidence of security and integrity on the second blockchain and therefore at least a portion of the second blockchain is invalidated.

Figure 6A:
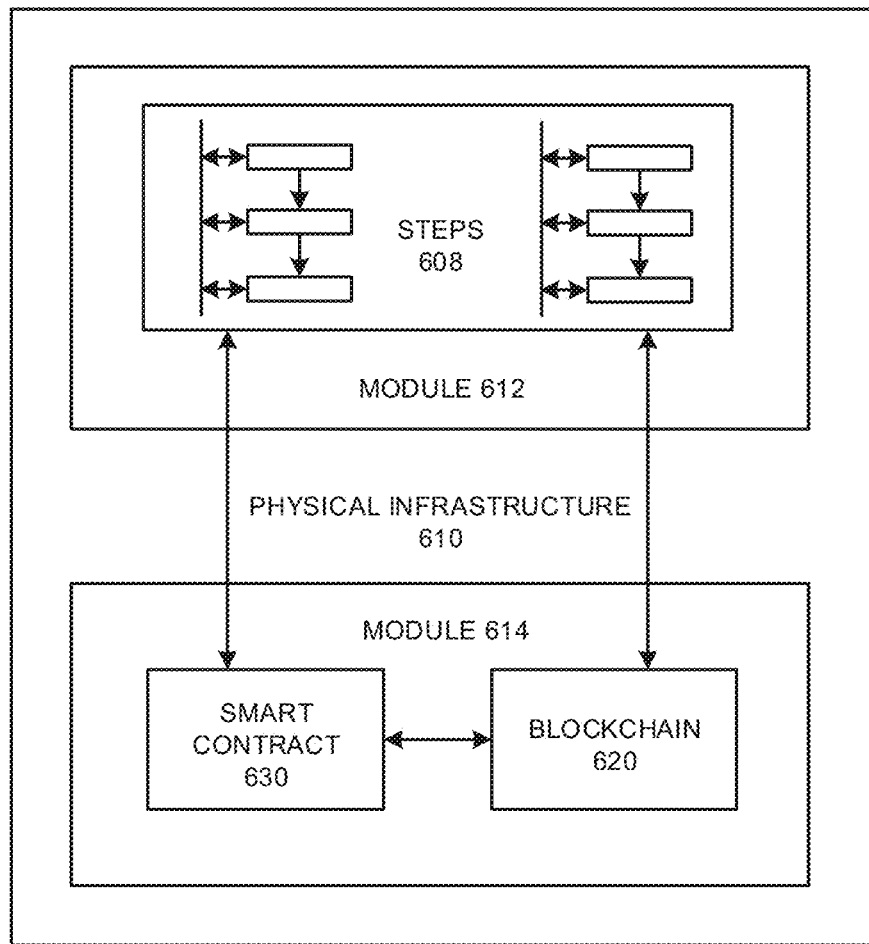
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
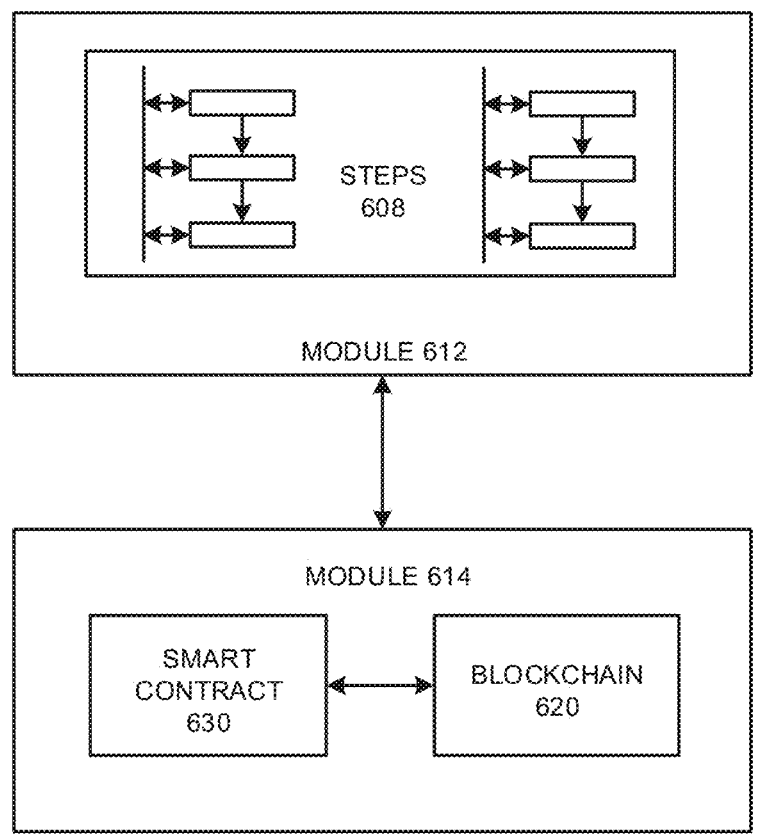
FIG. 6B illustrates another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
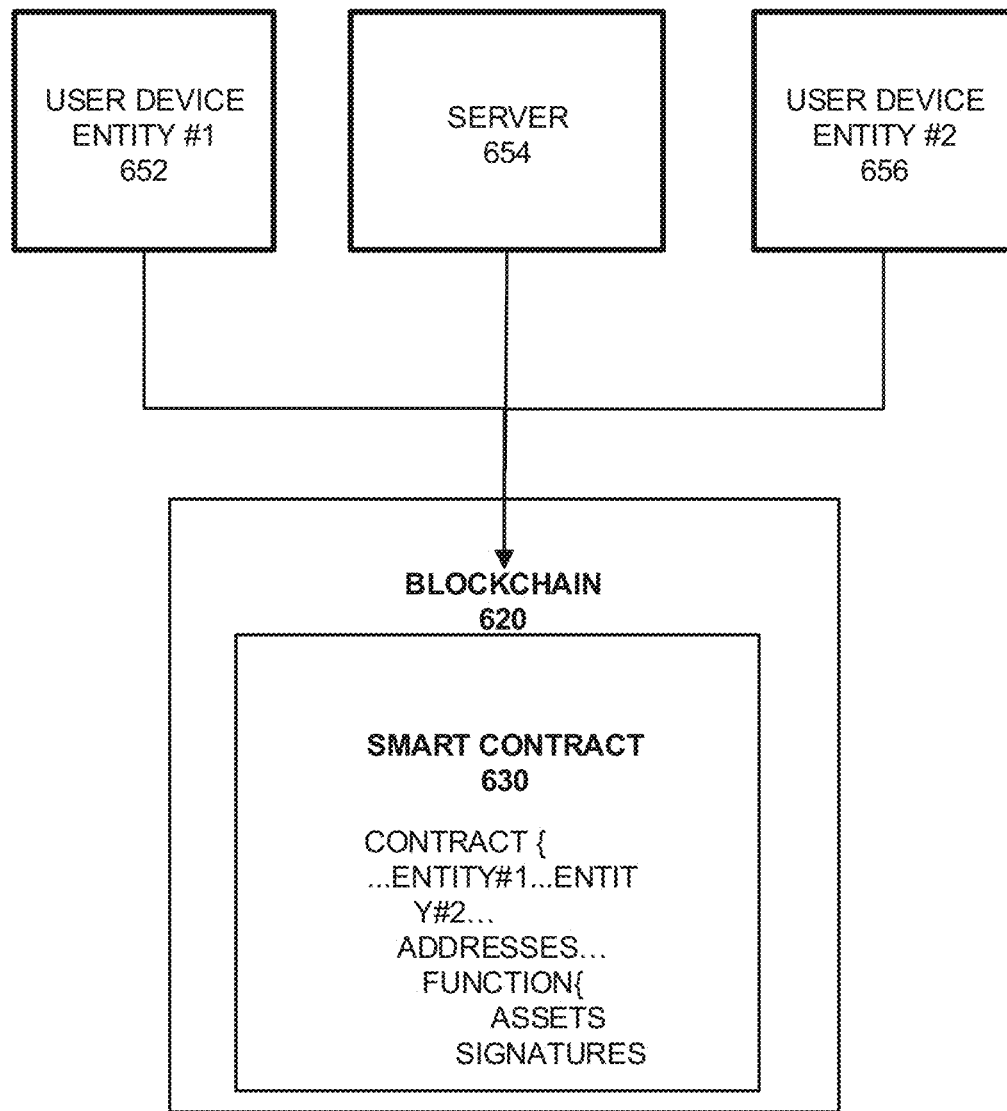
FIG. 6C illustrates a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
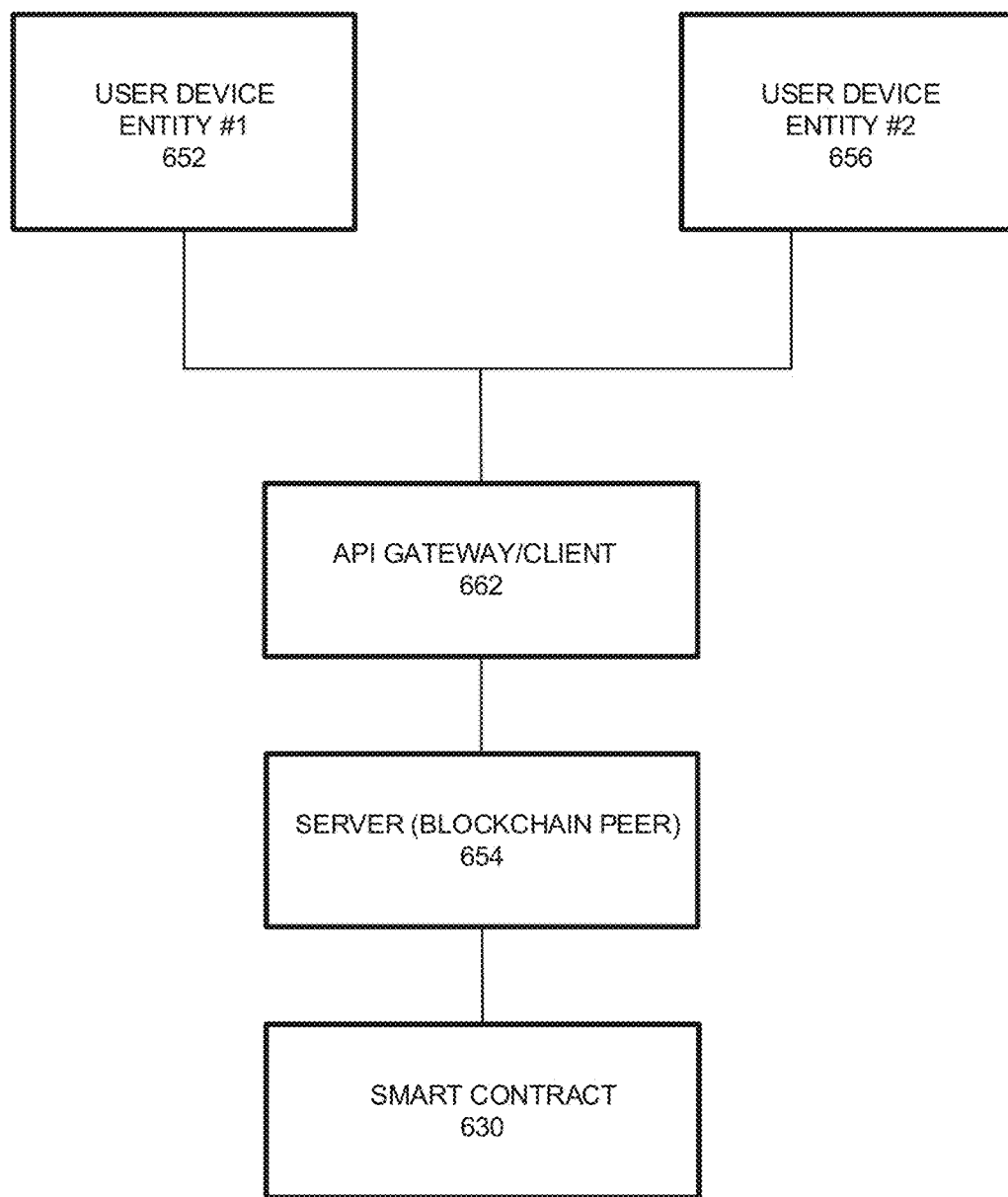
FIG. 6D illustrates yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
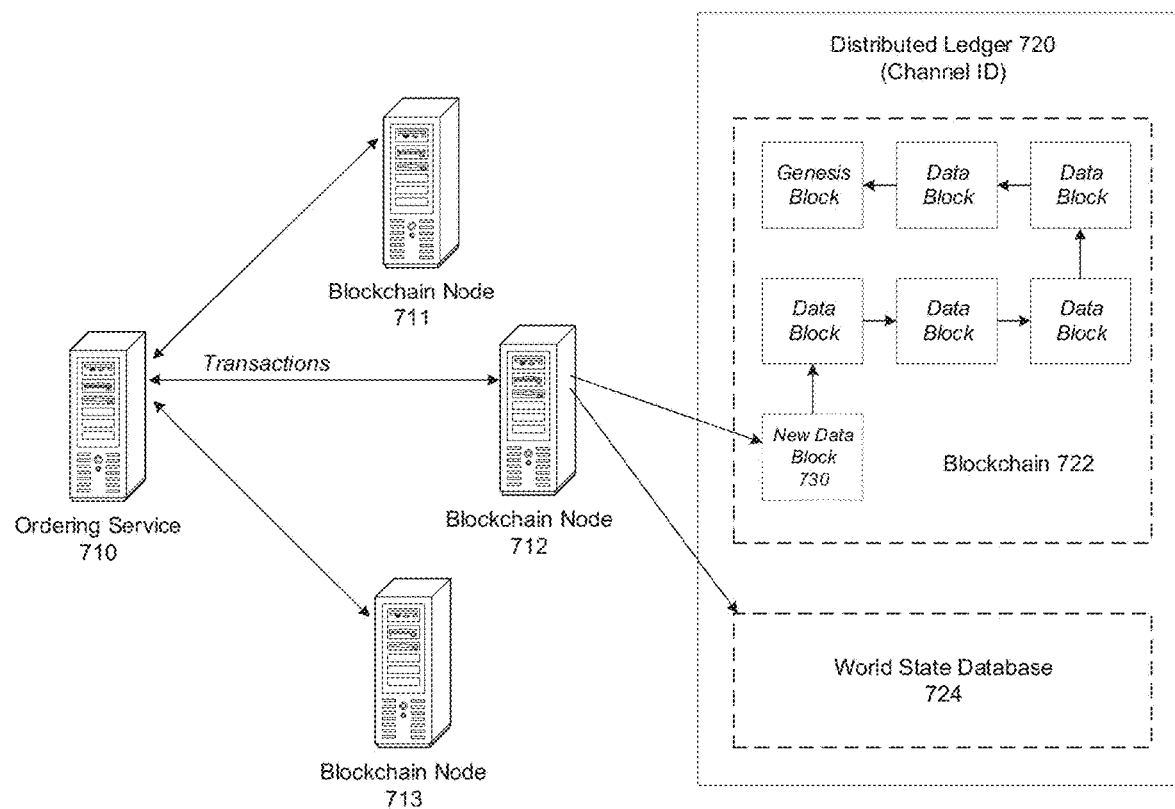
FIG. 7A illustrates a process for a new block being added to a distributed ledger, according to example embodiments.
Figure 7B:
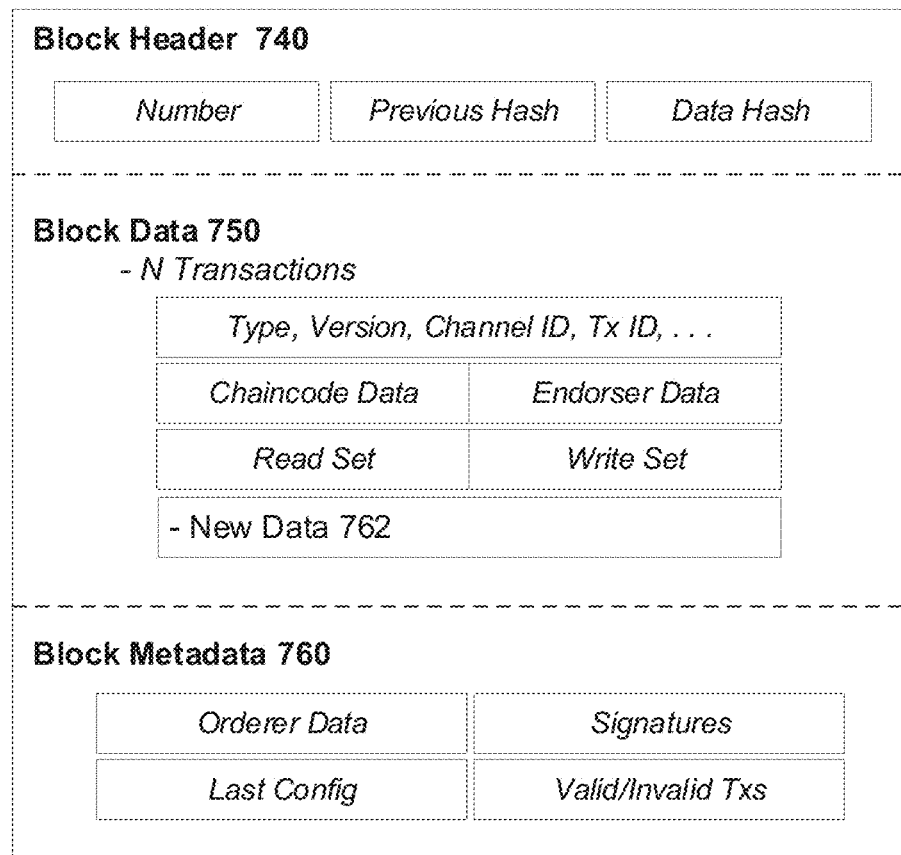
FIG. 7B illustrates contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger.

Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750, and block metadata 760. It should be appreciated that the various depicted blocks and their contents, such as new data block 730 and its contents. shown in FIG. 7B are merely examples and are not meant to limit the scope of the example embodiments. The new data block 730 may store transactional information of N transaction(s) (e.g., 1, 10, 100, 500, 1000, 2000, 3000, etc.) within the block data 750. The new data block 730 may also include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

The block data 750 may store transactional information of each transaction that is recorded within the new data block 730. For example, the transaction data may include one or more of a type of the transaction, a version, a timestamp, a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 750 may also store new data 762 which adds additional information to the hash-linked chain of blocks in the blockchain 722. The additional information includes one or more of the steps, features, processes and/or actions described or depicted herein. Accordingly, the new data 762 can be stored in an immutable log of blocks on the distributed ledger 720. Some of the benefits of storing such new data 762 are reflected in the various embodiments disclosed and depicted herein. Although in FIG. 7B the new data 762 is depicted in the block data 750 but could also be located in the block header 740 or the block metadata 760.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the block data 750 and a validation code identifying whether a transaction was valid/invalid.

Figure 7C:
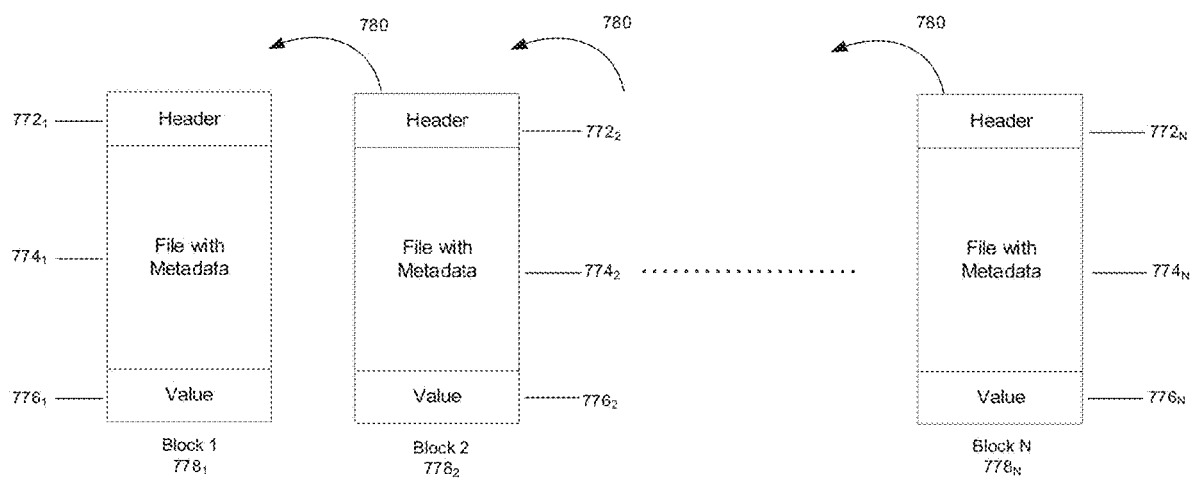
FIG. 7C illustrates a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 7C, the blockchain 770 includes a number of blocks $778_1$, $778_2$, . . . $778_N$ cryptographically linked in an ordered sequence, where N≥1. The encryption used to link the blocks $778_1$, $778_2$, . . . $778_N$ may be any of a number of keyed or un-keyed Hash functions. In one embodiment, the blocks $778_1$, $778_2$, . . . $778_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, . . . , $778_N$ may be cryptographically linked by a function that is different from a hash function. For purposes of illustration, the following description is made with reference to a hash function, e.g., SHA-2.

Each of the blocks $778_1$, $778_2$, . . . , $778_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
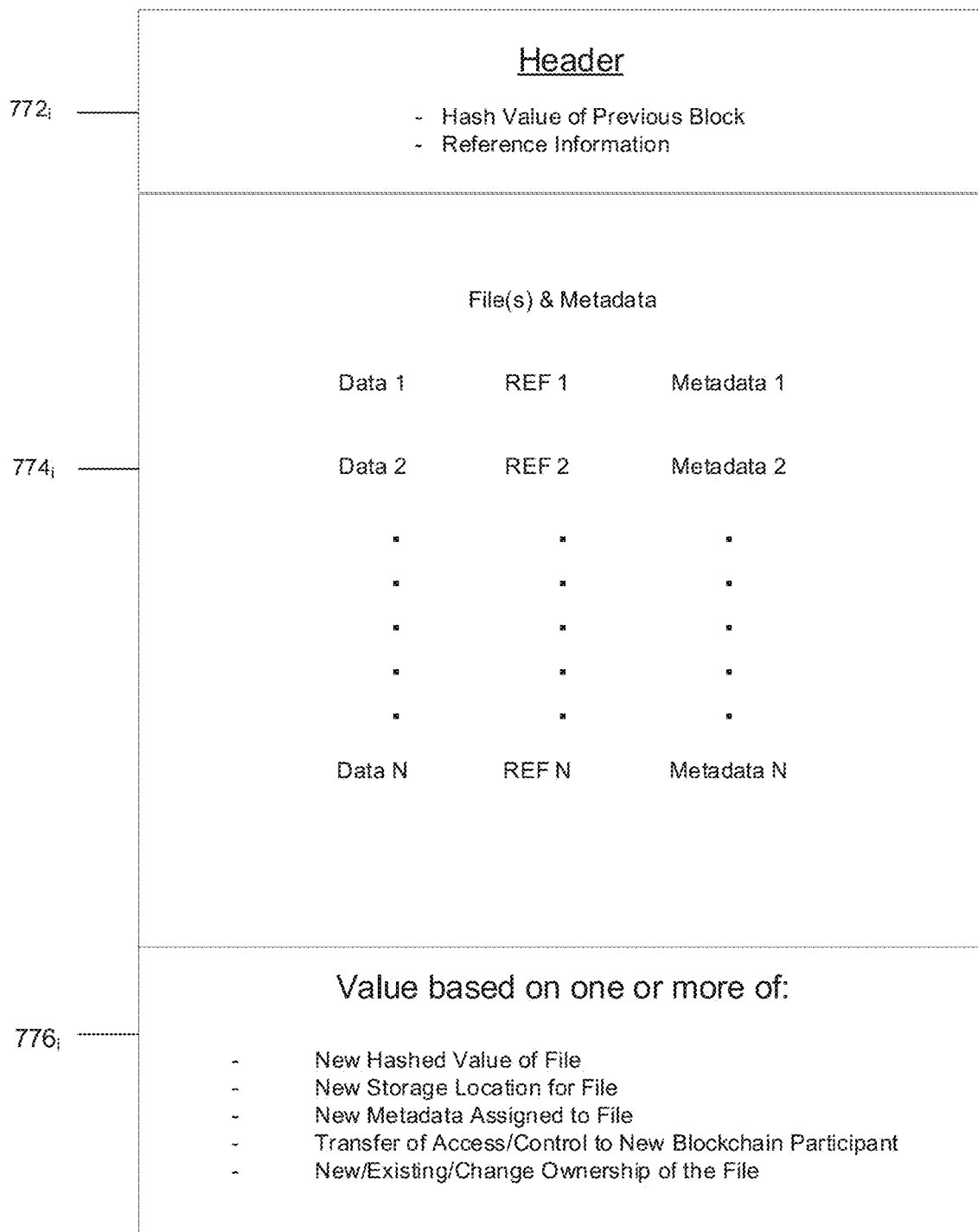
FIG. 7D illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 7D illustrates an embodiment of a block which may represent the structure of the blocks in the blockchain 790 in accordance with one embodiment. The block, $Block_i$, includes a header $772_i$, a file $774_i$, and a value $776_i$.

The header $772_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $774_i$ includes a plurality of data, such as Data 1, Data 2, . . . , Data N in sequence. The data are tagged with metadata Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8A:
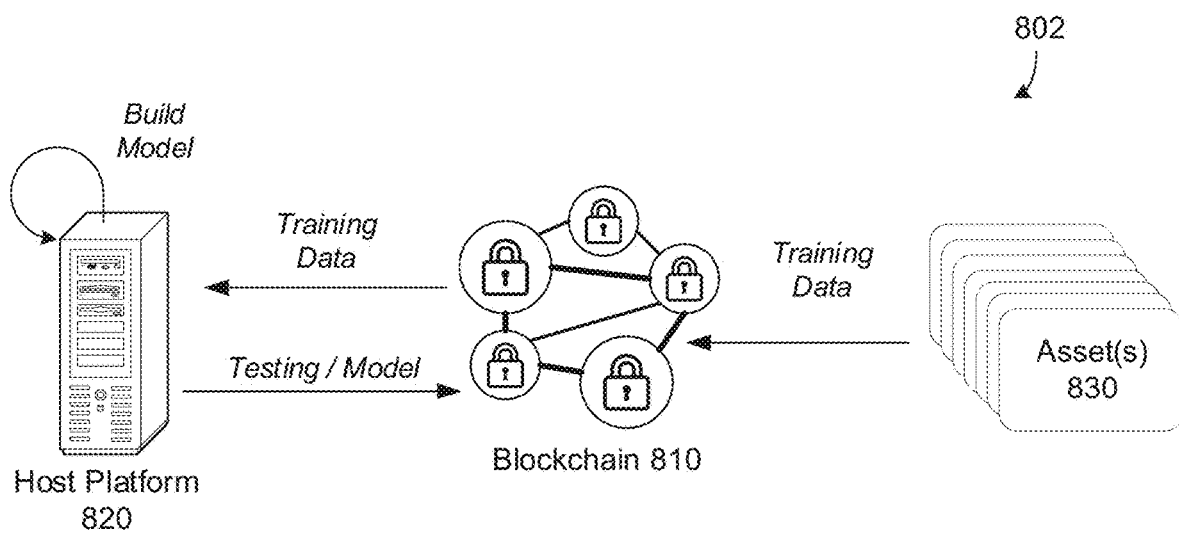
FIG. 8A illustrates an example blockchain which stores machine learning (artificial intelligence) data, according to example embodiments.
Figure 8A:
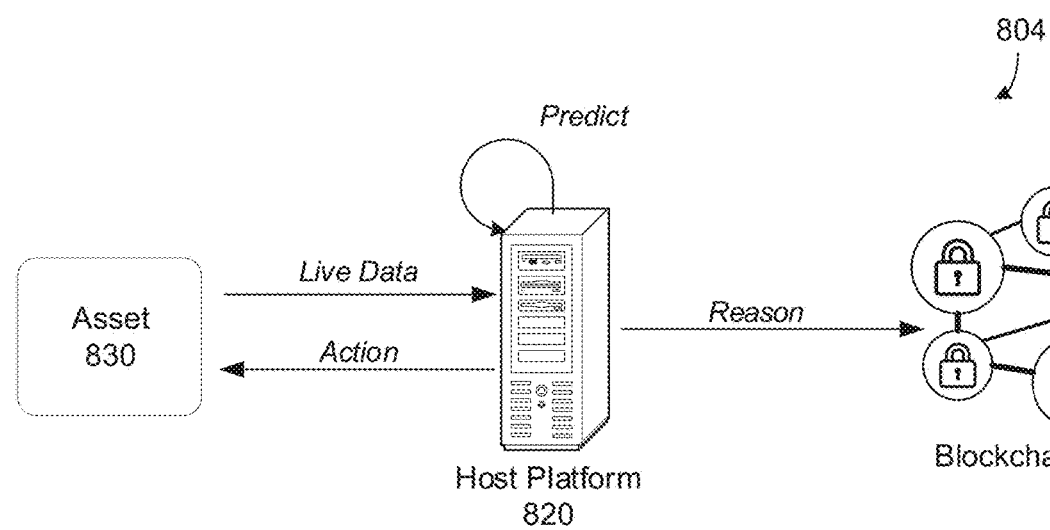
Figure 8B:
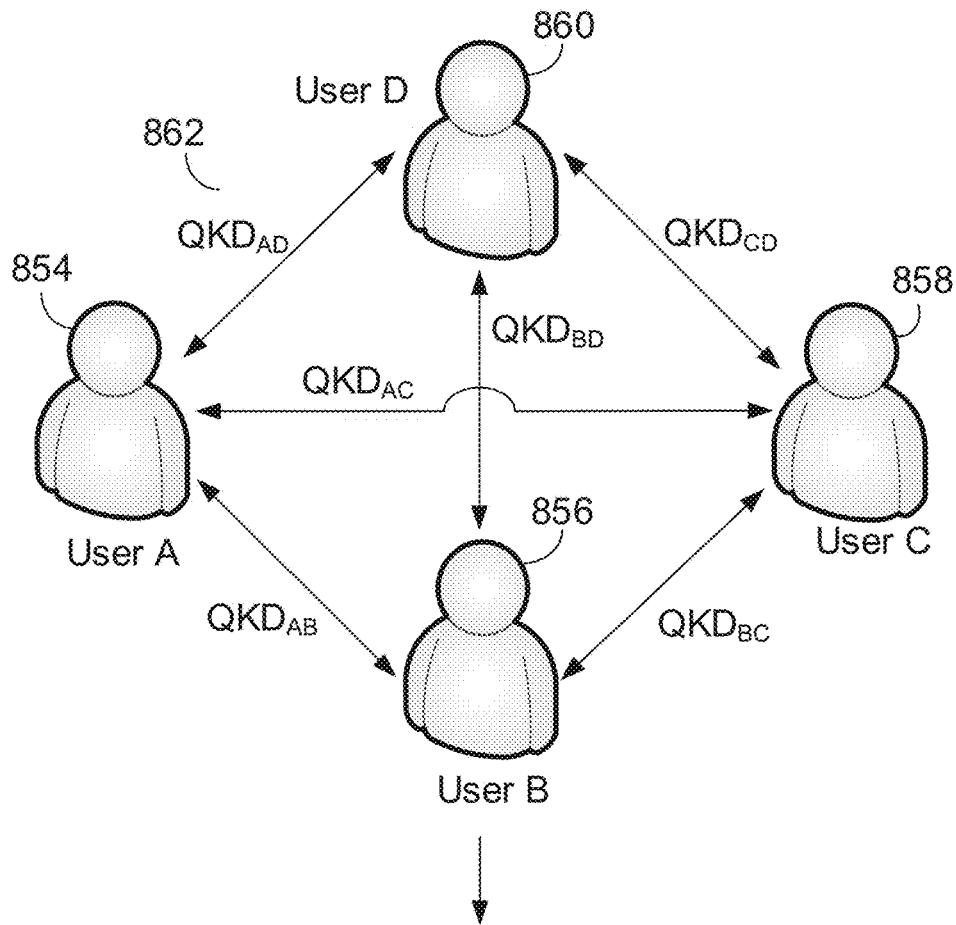
FIG. 8B illustrates an example quantum-secure blockchain, according to example embodiments.

FIGS. 8A and 8B illustrate additional examples of use cases for blockchain which may be incorporated and used herein. In particular, FIG. 8A illustrates an example 800 of a blockchain 810 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 8A, a host platform 820 builds and deploys a machine learning model for predictive monitoring of assets 830. Here, the host platform 820 may be a cloud platform, an industrial server, a web server, a personal computer, a user device, and the like. Assets 830 can be any type of asset (e.g., machine or equipment, etc.) such as an aircraft, locomotive, turbine, medical machinery and equipment, oil and gas equipment, boats, ships, vehicles, and the like. As another example, assets 830 may be non-tangible assets such as stocks, currency, digital coins, insurance, or the like.

The blockchain 810 can be used to significantly improve both a training process 802 of the machine learning model and a predictive process 804 based on a trained machine learning model. For example, in 802, rather than requiring a data scientist/engineer or other user to collect the data, historical data may be stored by the assets 830 themselves (or through an intermediary, not shown) on the blockchain 810. This can significantly reduce the collection time needed by the host platform 820 when performing predictive model training. For example, using smart contracts, data can be directly and reliably transferred straight from its place of origin to the blockchain 810. By using the blockchain 810 to ensure the security and ownership of the collected data, smart contracts may directly send the data from the assets to the individuals that use the data for building a machine learning model. This allows for sharing of data among the assets 830.

The collected data may be stored in the blockchain 810 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices which write directly to the blockchain can, in certain cases (i.e. supply chain, healthcare, logistics, etc.), increase both the frequency and accuracy of the data being recorded.

Furthermore, training of the machine learning model on the collected data may take rounds of refinement and testing by the host platform 820. Each round may be based on additional data or data that was not previously considered to help expand the knowledge of the machine learning model. In 802, the different training and testing steps (and the data associated therewith) may be stored on the blockchain 810 by the host platform 820. Each refinement of the machine learning model (e.g., changes in variables, weights, etc.) may be stored on the blockchain 810. This provides verifiable proof of how the model was trained and what data was used to train the model. Furthermore, when the host platform 820 has achieved a finally trained model, the resulting model may be stored on the blockchain 810.

After the model has been trained, it may be deployed to a live environment where it can make predictions/decisions based on the execution of the final trained machine learning model. For example, in 804, the machine learning model may be used for condition-based maintenance (CBM) for an asset such as an aircraft, a wind turbine, a healthcare machine, and the like. In this example, data fed back from the asset 830 may be input the machine learning model and used to make event predictions such as failure events, error codes, and the like. Determinations made by the execution of the machine learning model at the host platform 820 may be stored on the blockchain 810 to provide auditable/verifiable proof. As one non-limiting example, the machine learning model may predict a future breakdown/failure to a part of the asset 830 and create alert or a notification to replace the part. The data behind this decision may be stored by the host platform 820 on the blockchain 810. In one embodiment the features and/or the actions described and/or depicted herein can occur on or with respect to the blockchain 810.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000s of times faster) and consequently pose a much greater threat.

FIG. 8B illustrates an example 850 of a quantum-secure blockchain 852 which implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 8B, four users are present 854, 856, 858, and 860. Each of pair of users may share a secret key 862 (i.e., a QKD) between themselves. Since there are four nodes in this example, six pairs of nodes exists, and therefore six different secret keys 862 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the blockchain 852 is based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 854-860) authenticate the transaction by providing their shared secret key 862 (QKD). This quantum signature can be attached to every transaction making it exceedingly difficult to tamper with. Each node checks their entries with respect to a local copy of the blockchain 852 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a Byzantine agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 852. In one embodiment the features and/or the actions described and/or depicted herein can occur on or with respect to the blockchain 852.

Figure 9:
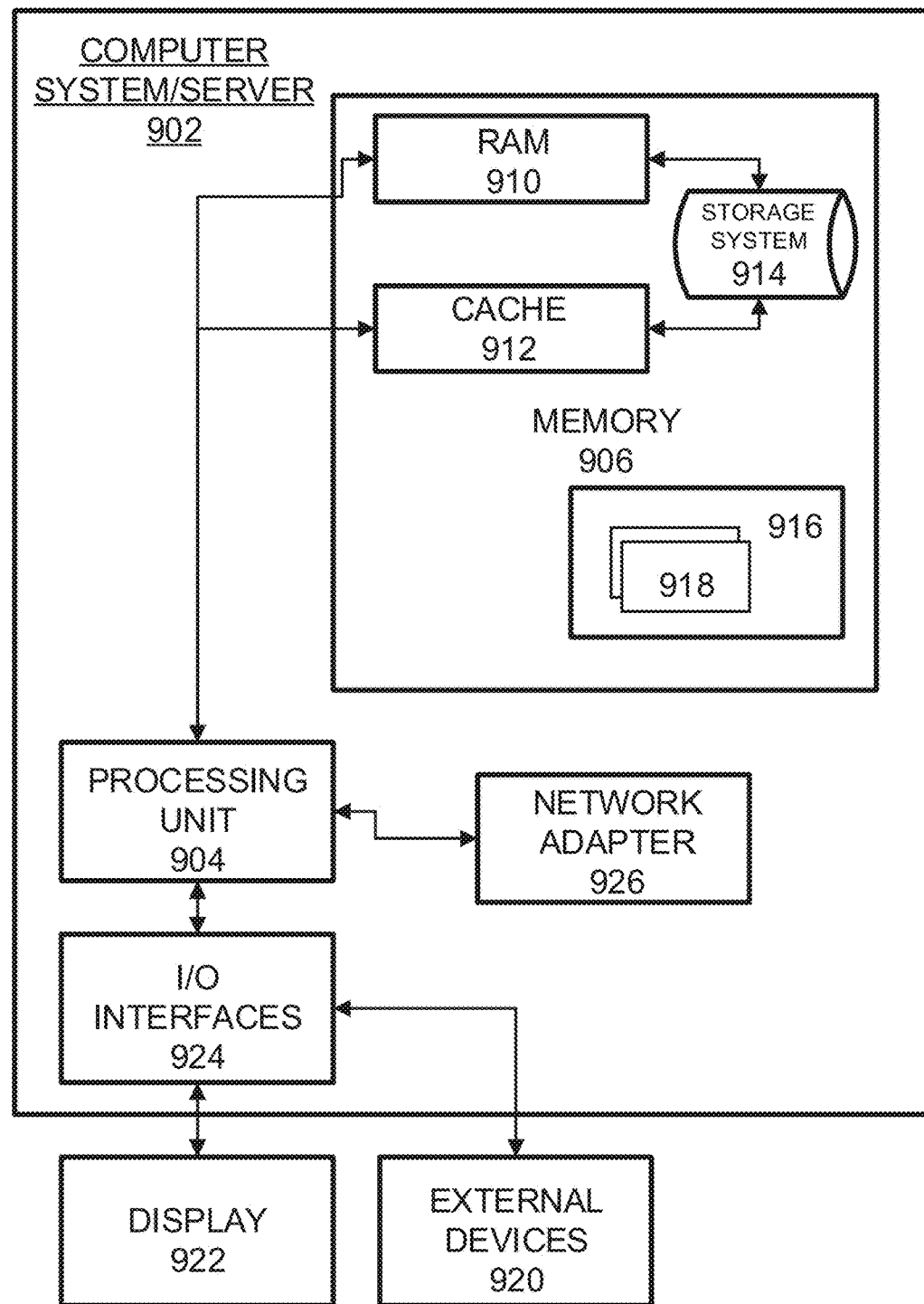
FIG. 9 illustrates an example system that supports one or more of the example embodiments.

FIG. 9 illustrates an example system 900 that supports one or more of the example embodiments described and/or depicted herein. The system 900 comprises a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A blockchain network, comprising:
a peripheral peer node and a plurality of other peripheral peer nodes, wherein the peripheral peer node and each other peripheral nodes, of the plurality of peripheral peer nodes, are associated with a processor that when executing one or more instructions stored in a memory configures the processor to:
in parallel, receive a batch of new blocks from an orderer peer of the blockchain network, and
in parallel, calculate hashes of the batch of new blocks,
in parallel, generate a Merkle tree having leaf nodes that are the hashes of the new batch of blocks,
in parallel, generate a root node hash of the Merkle tree; and
wherein the processor associated with the peripheral peer node is further configured to:
request and receive root node hashes from a majority of other peripheral peer nodes of the plurality of other peripheral peer nodes,
identify the orderer peer as potentially malicious based on an identification that a rood node hash of the received root node hashes is different than the root node has calculated by the processor associated with the peripheral peer node,
in response to the identification of the orderer peer as potentially malicious, request a new block from another peripheral peer node, of the majority of peripheral peer nodes, corresponding to the different root node hash, and
in response to a receipt of the new block, verify the orderer peer as malicious when the new block is different than the new block received from the orderer peer by the peripheral peer node.

2. The blockchain network of claim 1, wherein the processor associated with the peripheral peer node is further configured to:
cease committing new blocks to a ledger of the blockchain in response to the identification of the orderer peer as malicious.

3. The blockchain network of claim 1, wherein the processor associated with the peripheral peer node is further configured to:
request the root node hashes from the majority of other peripheral peer nodes.

4. The blockchain network of claim 1, wherein the processor associated with the each other peripheral peer nodes is further configured to:
request a root node hash from the peripheral peer node and from all other peripheral peer nodes of the majority of other peripheral peer nodes.

5. The blockchain network of claim 1, wherein the processor associated with the peripheral peer node is further configured to:
identify that all of the received root node hashes are different than the root node hash calculated by the peripheral peer node; and cease committing new blocks to a ledger of the blockchain in response to the identification that all of the received root node hashes are different than the root node has calculated by the peripheral peer node.

6. The blockchain network of claim 1, wherein the processor associated with the peripheral peer node is further configured to:
request the new blocks from the other peripheral peer node corresponding to the different root node hash.

7. The blockchain network of claim 1, wherein, when the processor associated with the peripheral peer node identifies that a root node hash of the received root node hashes is different than the calculated root node hash, the processor associated with the peripheral peer node is further configured to:
identify a potential chain forking attack by the orderer peer.

8. A method, comprising:
in parallel, receiving, by a peripheral peer and a plurality of other peripheral peers in a blockchain network, a batch of new blocks from an orderer peer of the blockchain network;
in parallel, calculating, by the peripheral peer and the plurality of other peripheral peers, hashes of the batch of new blocks,
in parallel, generating, by the peripheral peer and the plurality of other peripheral peers, a Merkle tree having leaf nodes that are the hashes of the new batch of blocks,
in parallel, generating, by the peripheral peer and the plurality of other peripheral peers, a root node hash of the Merkle tree; and
wherein the method further comprises:
requesting and receiving, by the peripheral peer, root node hashses from a majority of other peripheral peers of the plurality of other peripheral peers;
identifying, by the peripheral peer, the orderer peer as potentially malicious based on an identification that a root node hash of the received root node hashes is different than the root node hash calculated by the peripheral peer;
in reponse to the identifying the orderer peer as potentially malicious, requesting, by the peripheral peer, a new block from another peripheral peer, of the majority of peripheral peers, corresponding to the different root node hash; and
in response to receiving the new block, verifying, by the peripheral peer, the orderer peer as malicious when the new block is different than the new block received from the orderer peer by the peripheral peer.

9. The method of claim 8, wherein the method further comprises:
ceasing, by peripheral peer, committing new blocks to a ledger of the blockchain in response to the identification of the orderer peer as malicious.

10. The method of claim 8, wherein the method further comprises:
requesting, by peripheral peer, the root node hashes from the majority of other peripheral peers.

11. The method of claim 8, wherein the method further comprises:
requesting, by each other peripheral peer of the majority of other peripheral peers, a root node hash from the peripheral peer and from all other peripheral peers of the majority of other peripheral peers.

12. The method of claim 8, wherein the method further comprises:
identifying, by peripheral peer, that all of the received root node hashes are different than the root node hash calculated by the peripheral peer; and
ceasing, by peripheral peer, committing new blocks to a ledger of the blockchain in response to the identification that all of the received root node hashes are different than the root node hash calculated by the peripheral peer.

13. The method of claim 8, wherein the method further comprises:
requesting, by peripheral peer, the new block from the other peripheral peer corresponding to the different root node hash.

14. The method of claim 8, wherein the identifying that a root node hash of the received root node hashes is different than the root node hash calculated by the peripheral peer further comprises:
identifying, by peripheral peer, a potential chain forking attack by the orderer peer.

15. A non-transitory computer readable medium comprising one or more instructions, that when executed by one or more processors of a peripheral peer and a plurality of other peripheral peers in a blockchain network cause the one or more processor to perform:
in parallel, receiving a batch of new blocks from an orderer peer of the blockchain network;
in parallel, calculating hashes of the batch of new blocks,
in parallel, generating a Merkle tree having leaf nodes that are the hashes of the new batch of blocks,
in parallel, generating a root node hash of the Merkle tree; and
wherein the one or more instructions further cause the one or more processors of the peripheral peer to perform:
requesting and receiving root node hashes from a majority of other peripheral peers of the plurality of other peripheral peers;
identifying the orderer peer as potentially malicious based on an identification that a root node hash of the received root node hashes is different than the root node hash calculated by the peripheral peer;
in response to the identifying the orderer peer as potentially malicious, requesting a new block from another peripheral peer, of the majority of peripheral peers, corresponding to the different root node hash; and
in response to receiving the new block, verifying the orderer peer as malicious when the new block received from the other peripheral peer is different than the new block received from the orderer peer by the peripheral peer.

16. The non-transitory computer readable medium of claim 15, wherein each of the one or more instructions further cause the one or more processors of the peripheral peer to perform:
ceasing committing new blocks to a ledger of the blockchain in response to the identification of the orderer peer as malicious.

17. The non-transitory computer readable medium of claim 15, wherein the one or more instructions further cause the one or more processors of the peripheral peer to perform:
requesting the root node hashes from the majority of other peripheral peers.

18. The non-transitory computer readable medium of claim 15, wherein the one or more instructions further cause the one or processors of the plurality of other peripheral peers to perform:
   requesting, by each other peripheral peer of the majority of other peripheral peers, a root node hash from the peripheral peer and from all other peripheral peers of the majority of other peripheral peers.

19. The non-transitory computer readable medium of claim 15, wherein the one or more instructions further cause the one or more processors of the peripheral peers to perform:
   identifying that all of the received root node hashes are different than the hash calculated by the peripheral peer; and
   ceasing committing new blocks to a ledger of the blockchain in response to the identification that all of the received hashes are different than the root node hash calculated by the peripheral peer.

20. The non-transitory computer readable medium of claim 15, wherein the one or more instructions further cause the one or more processors of the peripheral peer to perform:
   requesting the new block from the other peripheral peer corresponding to the different root node hash.

* * * * *